(12) United States Patent
Perrault et al.

(10) Patent No.: US 9,393,739 B2
(45) Date of Patent: Jul. 19, 2016

(54) RACK TYPE PIPE FEEDER FOR A PIPE FUSION MACHINE

(71) Applicant: McElroy Manufacturing, Inc., Tulsa, OK (US)

(72) Inventors: James R. Perrault, Tulsa, OK (US); David Warren Porter, Tulsa, OK (US); Brandon William Jackman, Owasso, OK (US); William Barton Draeger, Tulsa, OK (US); Bobby L. Murray, Broken Arrow, OK (US); Timothy M. Thoman, Tulsa, OK (US); Arthur H. McElroy, II, Tulsa, OK (US)

(73) Assignee: McElroy Manufacturing, Inc., Tulsa, OK (US)

( * ) Notice: Subject to any disclaimer, the term of this patent is extended or adjusted under 35 U.S.C. 154(b) by 29 days.

(21) Appl. No.: 14/246,979

(22) Filed: Apr. 7, 2014

(65) Prior Publication Data

US 2014/0219770 A1    Aug. 7, 2014

Related U.S. Application Data

(63) Continuation of application No. 12/932,155, filed on Feb. 18, 2011, now Pat. No. 8,690,517, which is a continuation-in-part of application No. 12/283,391, filed on Sep. 11, 2008, now abandoned, which is a (Continued)

(51) Int. Cl.
*B65G 65/44* (2006.01)
*B65G 59/06* (2006.01)

(Continued)

(52) U.S. Cl.
CPC ............. *B29C 66/65* (2013.01); *B29C 31/002* (2013.01); *B65G 1/0442* (2013.01); *B65G 1/08* (2013.01);

(Continued)

(58) Field of Classification Search
CPC ....... E21B 19/15; E21B 19/155; B23K 11/02; B23K 2201/06; B23K 2201/26; B23K 31/027; B23K 37/0452; B23K 37/053; B29C 65/2076; B29C 65/2092; B29C 65/7802; B29C 65/7841; B29C 66/324; B29C 66/522; B29C 66/8414; B65G 1/0442; B65G 1/08; B65G 25/02; B65G 47/266; Y10S 118/11; Y10S 414/123; Y10T 29/5185; Y10T 83/2203; Y10T 83/6556; Y10T 83/6606; Y10T 83/6633
USPC .................. 198/367, 463.5, 468.7, 535, 597; 219/158; 226/170, 184; 312/45; 414/14–15, 17–18, 22.54–22.62, 414/745.1, 745.3, 745.4, 745.7, 745.8, 414/746.1–746.5, 746.8; 228/44.5; 269/289 MR; 29/238, 281.5, 282, 33 D; 405/170

See application file for complete search history.

(56) References Cited

U.S. PATENT DOCUMENTS 2,166,608 A    6/1937    Postlewaite
2,436,499 A    2/1948    Williams (Continued)

FOREIGN PATENT DOCUMENTS

JP    57151506    9/1982
JP    59133117    7/1984
SU    1435480    11/1988

*Primary Examiner* — Gregory Adams
(74) *Attorney, Agent, or Firm* — Frank J. Catalano; Gable Gotwals

(57) ABSTRACT

For use in loading heavy sticks of plastic pipe into a pipe fusion machine, a pipe storage rack with hydraulically powered pipe stick dispensers and stands allows sticks of pipe stored on the rack to roll gravitationally onto a rocking V-shaped dispenser cam disposed between the rack and the fusion machine loading path for one-stick-at-a-time loading onto powered track and roller stands which enable Cartesian manipulation of the stick into the fusion machine. The cam is adjustable to suit pipe stick diameters ranging from 20" to 48". Many sticks can be stored at one time, releasing heavy lifting equipment and operators to work elsewhere. The process requires only one operator using a pendant controller and the pipe sticks are handled by heavy equipment only when being loaded onto the racks.

6 Claims, 20 Drawing Sheets

Related U.S. Application Data continuation-in-part of application No. 11/518,052, filed on Sep. 8, 2006, now Pat. No. 8,464,410.

(60) Provisional application No. 61/371,329, filed on Aug. 6, 2010.

(51) Int. Cl.
  *B65G 47/08* (2006.01)
  *B29C 65/00* (2006.01)
  *B29C 31/00* (2006.01)
  *B65G 1/04* (2006.01)
  *B65G 47/06* (2006.01)
  *B65G 1/08* (2006.01)
  *B29C 65/78* (2006.01)
  *B29K 23/00* (2006.01)

(52) U.S. Cl.
  CPC ............... *B65G 47/06* (2013.01); *B29C 65/78* (2013.01); *B29C 66/5221* (2013.01); *B29C 66/71* (2013.01); *B29K 2023/00* (2013.01)

(56) References Cited

U.S. PATENT DOCUMENTS

| | | | |
|---|---|---|---|
| 2,472,654 A | 6/1949 | Engelke | |
| 2,500,204 A * | 3/1950 | Ronay | 228/44.5 |
| 2,705,119 A | 3/1955 | Ingwer | |
| 2,733,330 A | 1/1956 | Blewett | |
| 2,763,236 A * | 9/1956 | Cummings | 118/69 |
| 2,903,116 A | 9/1959 | Jessup et al. | |
| 3,076,562 A | 2/1963 | Pitts | |
| 3,129,805 A | 4/1964 | Krahn et al. | |
| 3,178,146 A | 4/1965 | Goodale | |
| 3,254,776 A | 6/1966 | Brown | |
| 3,313,505 A | 4/1967 | Petrie | |
| 3,690,472 A | 9/1972 | Poore et al. | |
| 3,741,509 A | 6/1973 | Kelly | |
| 3,787,039 A | 1/1974 | Zeichman | |
| 3,792,783 A | 2/1974 | Brown | |
| 3,902,699 A | 9/1975 | Brackett | |
| 3,916,500 A | 11/1975 | Brown | |
| 3,984,007 A * | 10/1976 | Birdwell | 414/745.7 |
| 3,999,684 A | 12/1976 | Ekholm | |
| 4,067,450 A | 1/1978 | Birdwell | |
| 4,132,339 A * | 1/1979 | Gurevich et al. | 228/103 |
| 4,193,486 A | 3/1980 | Borzym et al. | |
| 4,397,054 A * | 8/1983 | Lee, Jr. | 82/164 |
| 4,520,981 A | 6/1985 | Harrigan | |
| 4,533,055 A | 8/1985 | Haney | |
| 4,628,781 A | 12/1986 | Rowley | |
| 4,697,446 A | 10/1987 | Yamamoto et al. | |
| 4,732,522 A | 3/1988 | Pence | |
| 5,011,024 A | 4/1991 | Bunney | |
| 5,064,156 A | 11/1991 | Handler et al. | |
| 5,102,286 A | 4/1992 | Fenton | |
| 5,115,599 A | 5/1992 | Stolzer et al. | |
| 5,297,779 A | 3/1994 | Collins, Jr. et al. | |
| 5,337,875 A | 8/1994 | Lee | |
| 5,358,371 A | 10/1994 | Neddo | |
| 5,441,588 A * | 8/1995 | Kime et al. | 156/499 |
| 5,711,358 A | 1/1998 | Willis | |
| 5,763,850 A * | 6/1998 | Hardt | 219/104 |
| 5,901,935 A | 5/1999 | Lai | |
| 5,934,626 A | 8/1999 | Collins, Jr. | |
| 6,283,361 B1 * | 9/2001 | Maki et al. | 228/212 |
| 6,461,255 B1 | 10/2002 | Smith | |
| 6,575,213 B1 | 6/2003 | Houk | |
| 6,612,533 B2 | 9/2003 | Biles et al. | |
| 6,719,515 B2 | 4/2004 | Tolmon et al. | |
| 6,988,719 B2 | 1/2006 | Ursell et al. | |
| 7,182,316 B2 | 2/2007 | Sykes | |
| 7,240,885 B1 | 7/2007 | Sullivan | |
| 7,240,886 B2 | 7/2007 | Jones | |
| 7,363,991 B2 | 4/2008 | Baer | |
| 7,736,119 B2 | 6/2010 | Belik | |
| 8,464,410 B1 * | 6/2013 | Lyon et al. | 29/240 |
| 8,690,517 B1 * | 4/2014 | Perrault et al. | 414/746.2 |
| 2005/0189454 A1 | 9/2005 | Smith et al. | |
| 2006/0000462 A1 | 1/2006 | Kurtz, Jr. | |

* cited by examiner

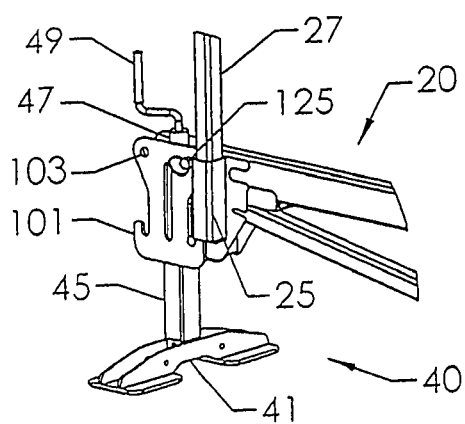
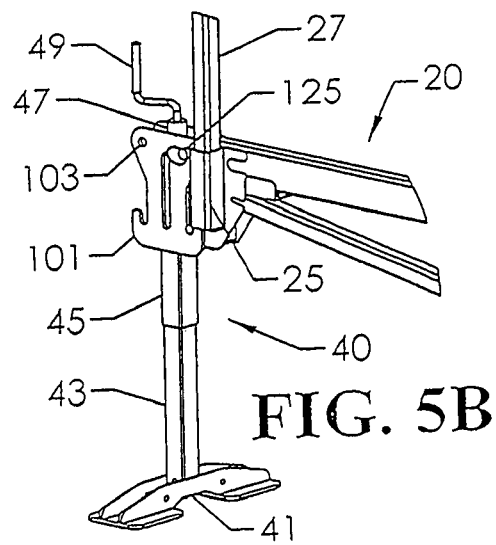

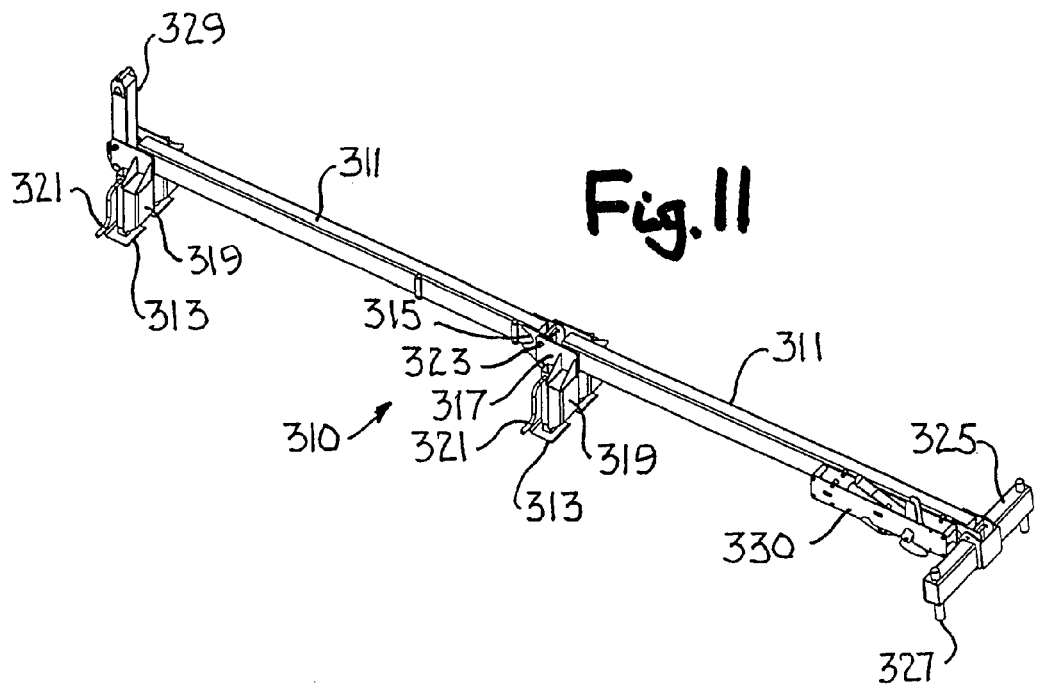
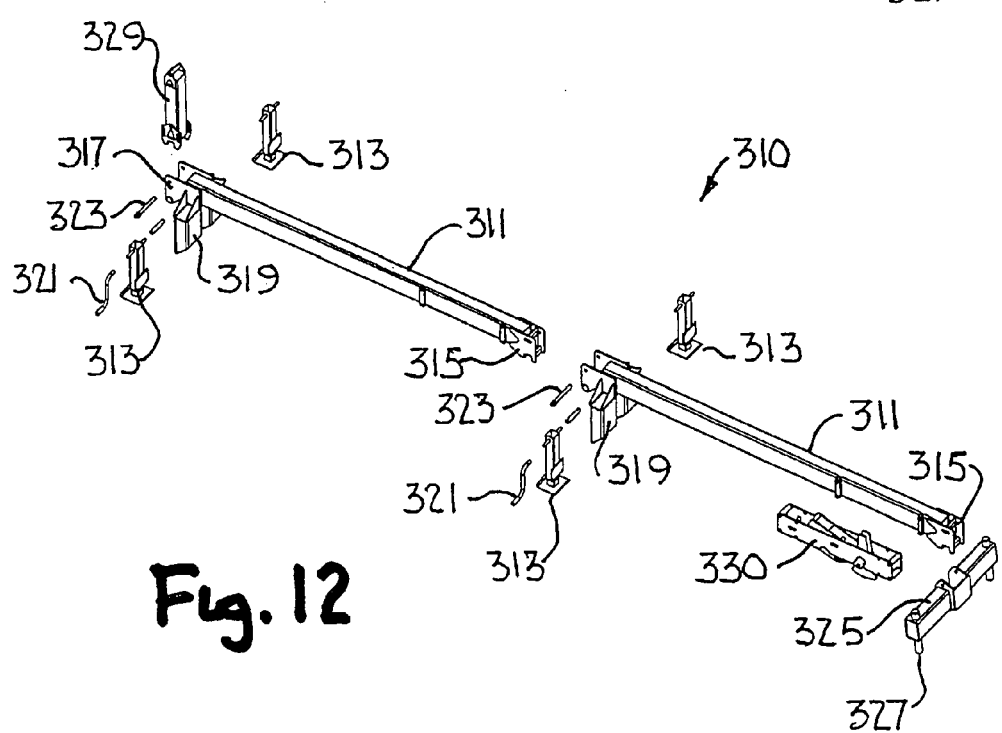

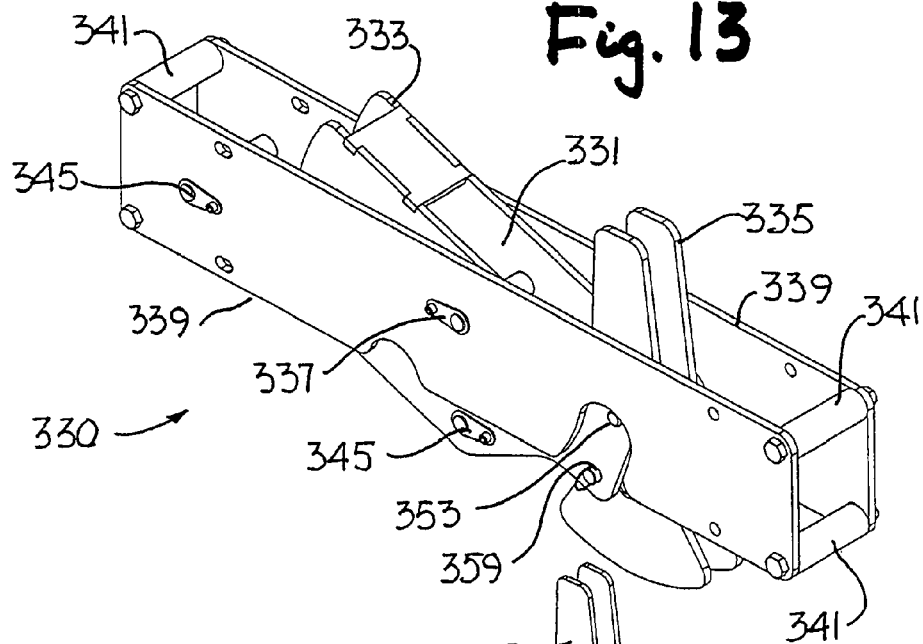
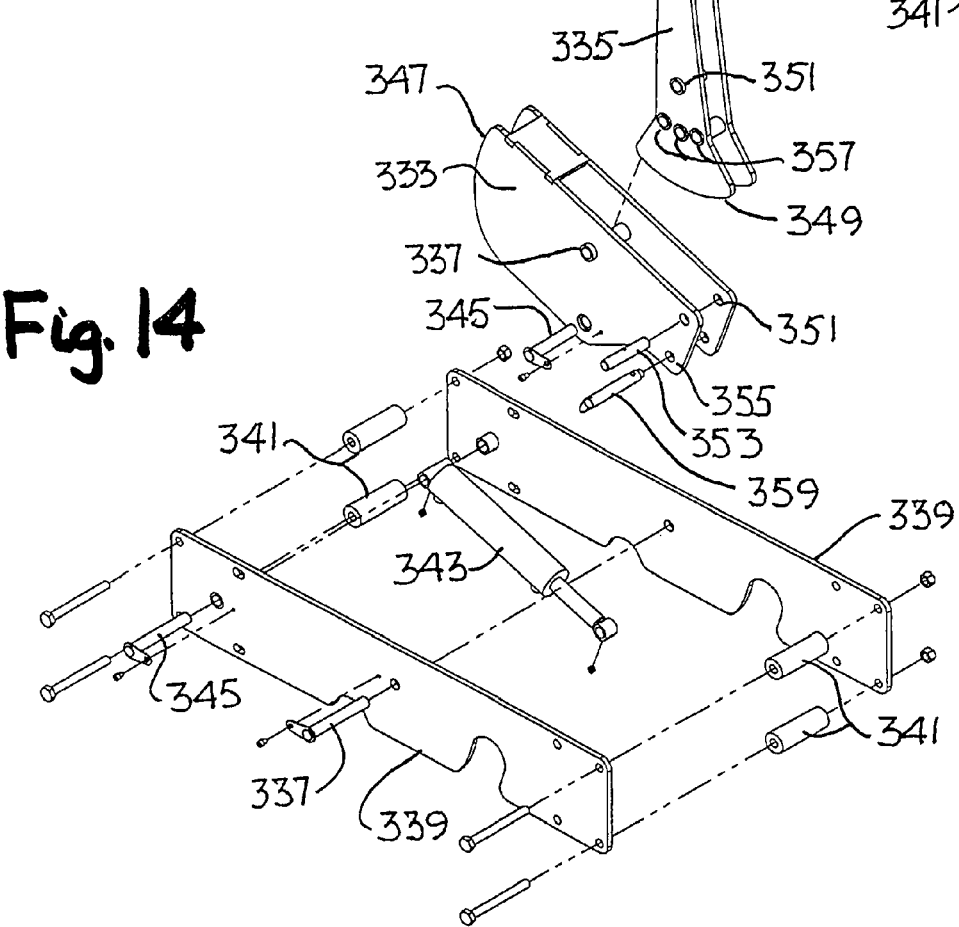

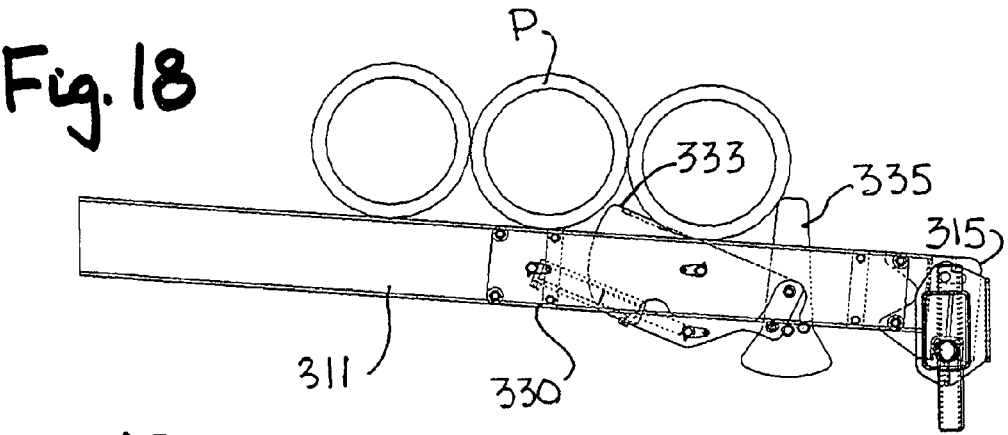
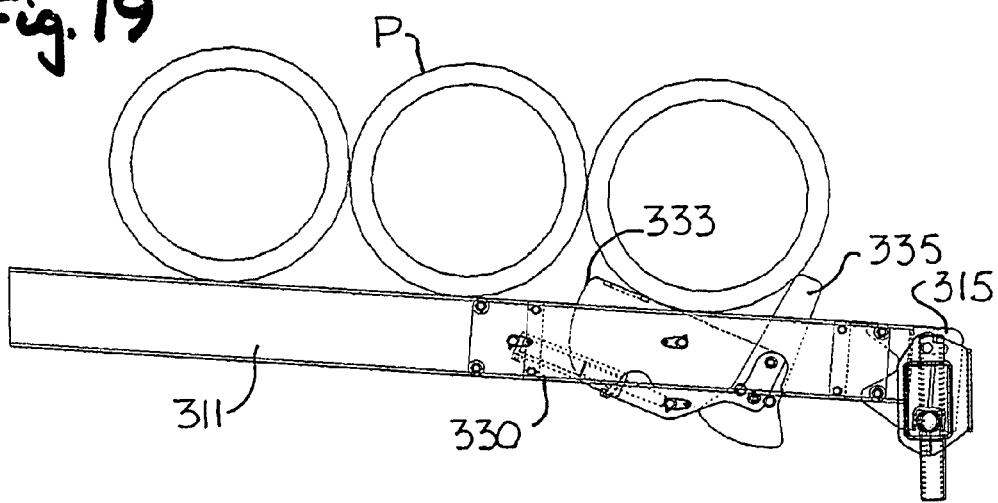
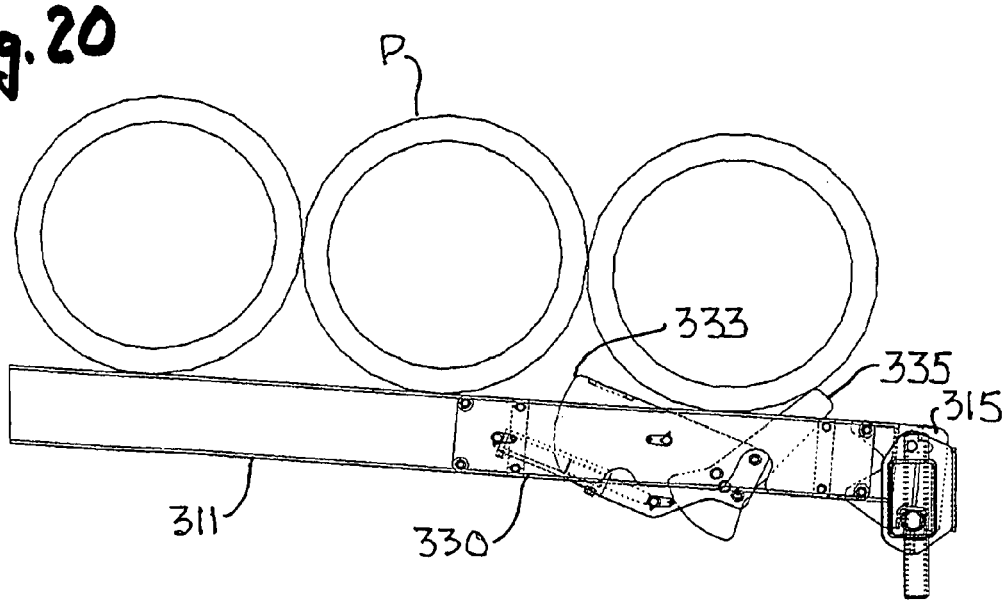

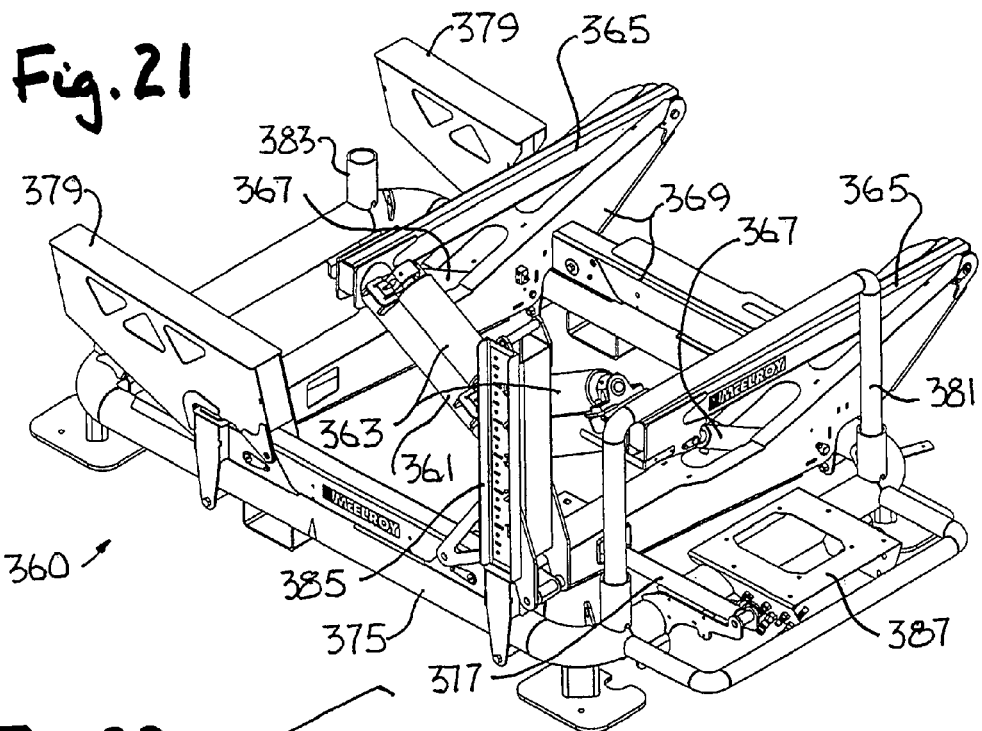
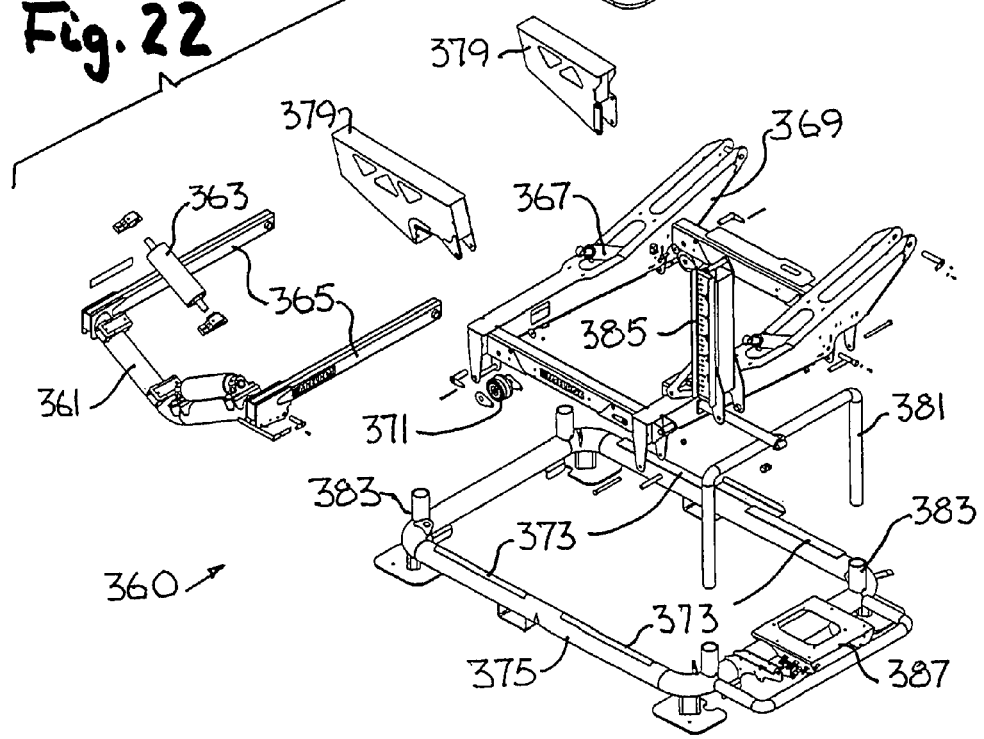

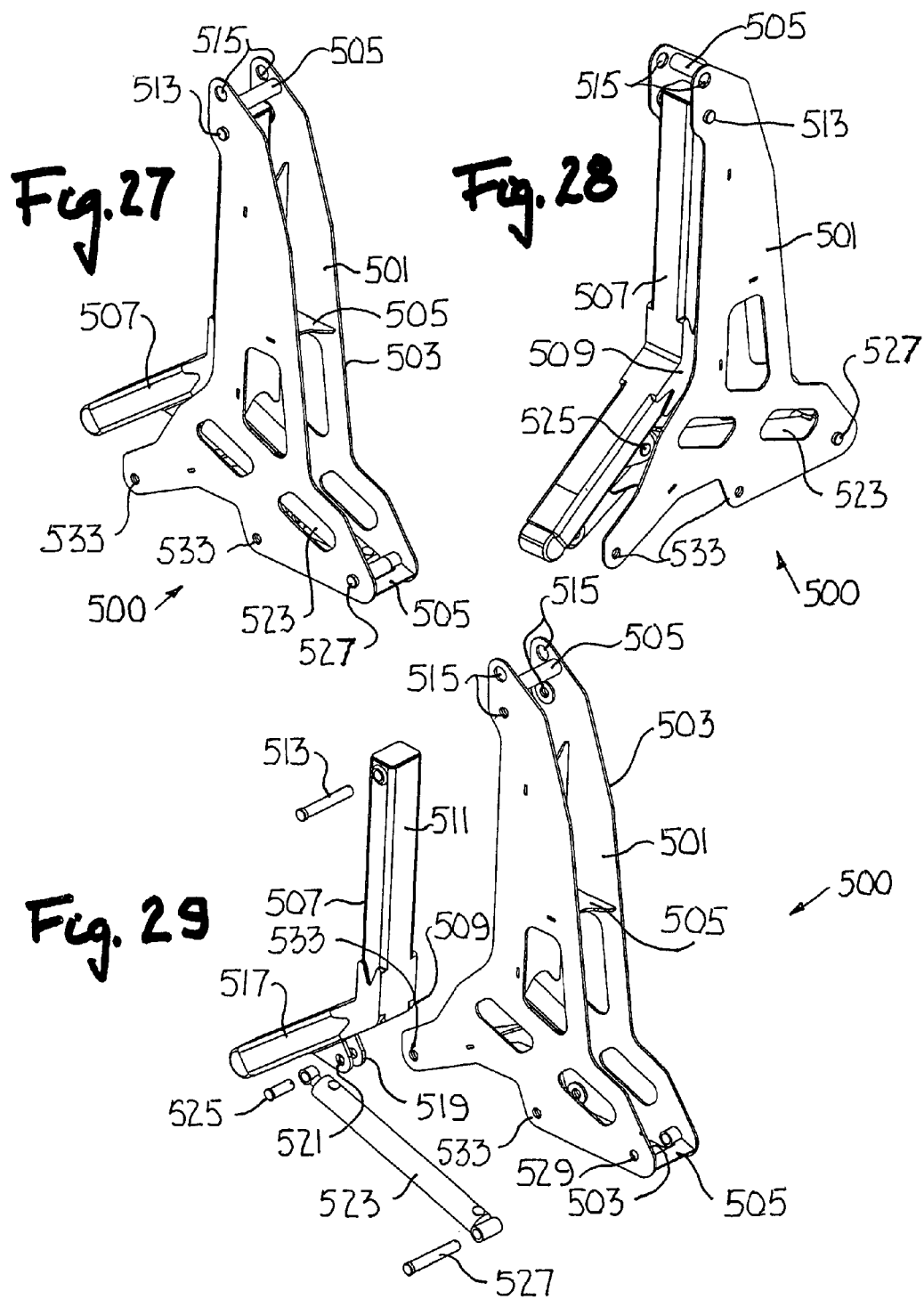

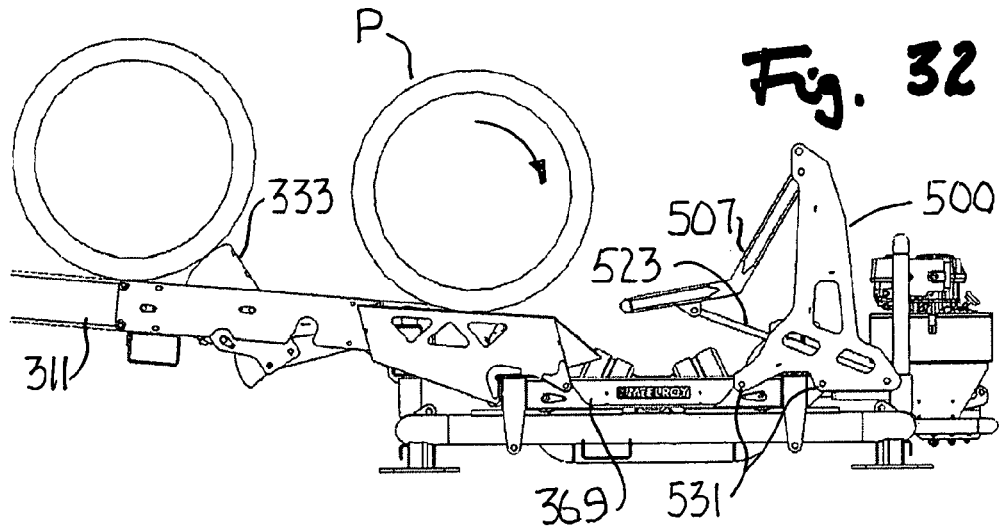
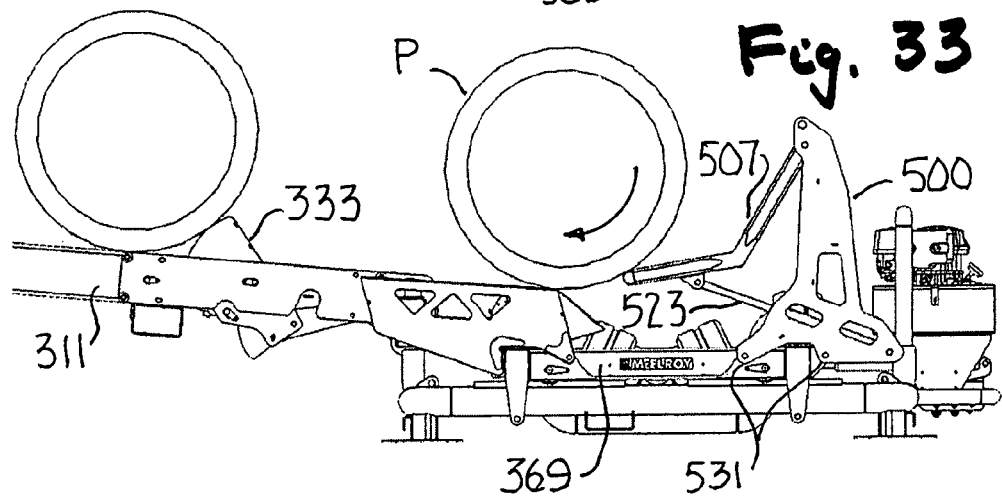
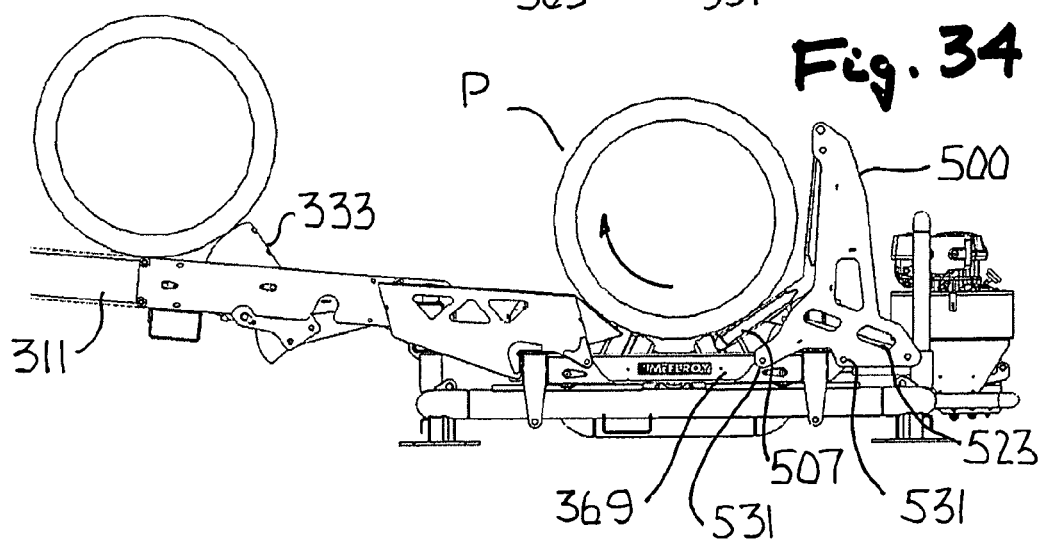

RACK TYPE PIPE FEEDER FOR A PIPE FUSION MACHINE

CROSS REFERENCE TO RELATED APPLICATIONS

This application is a continuation application claiming priority to U.S. patent application Ser. No. 12/932,155 filed Feb. 18, 2011. U.S. patent application Ser. No.12/932,155 is a conversion application of U.S. Provisional Application No.61/371,329 filed Aug. 6, 2010, and a continuation-in-part of U.S. patent application Ser. No. 12/283,391 filed Sep. 11, 2008, which is a continuation-in-part application of U.S. application Ser. No. 11/518,052 filed Sep. 8, 2006, now U.S. Pat. No. 8,464,410.

BACKGROUND OF THE INVENTION

This invention relates generally to high density polyethylene (HDPE) pipe fusion equipment and more particularly concerns equipment for feeding sticks of pipe into a machine for fusion to the trailing end of a pipeline.

Handling and staging sticks of pipe to be fed into a pipe fusion machine are presently labor intensive, time consuming tasks requiring use of expensive pipe loading, unloading and manipulating equipment and causing extensive downtime of the fusion machine while each stick of pipe is maneuvered into the machine and of the peripheral equipment while the fusion machine is in operation.

Typically, heavy construction equipment, such as telehandlers, backhoe loaders and fork trucks, are used to handle the sticks of pipe. Some pipe stands are available for use in the pipe fusion process, but they hold only one stick of pipe at a time and, despite use of the stand, other jobsite equipment is still required to load and position each and every stick of pipe in the fusion machine. More recently, a pipe storage rack has been combined with a single pipe stand, making it easier to load sticks of pipe onto the stand. It is not, however, an effective tool for manipulating sticks of pipe into a fusion machine. Furthermore, because of the pipe size, terrain contour and pipe loading limitations of this combination, there are many applications in which it is of little use at all.

Regardless of pipe stick diameter, joining sticks of plastic pipe to a pipeline by heat fusion requires loading the sticks of pipe, one at a time, into the fusion machine. Sticks of small diameter pipe, ranging up to about 6" in diameter, can be loaded into the fusion machine by hand. Intermediate diameter sticks, ranging up to about 8" in diameter, can be loaded by hand operated equipment. pipe handling equipment hereinbefore described facilitates loading of up to 20" diameter pipe sticks by a single person but, as also disclosed, a power assisted option is useful for moving the 8" to 20" diameter sticks of pipe axially into the fusion machine.

Loading large diameter sticks of pipe, ranging from 8" to 48" in diameter, typically requires powered, heavy lifting equipment and normally requires two people, one operating the heavy lifting equipment and the other assisting in guiding the stick of pipe into the machine in response to hand signals between the operator and the assistant. Typically, the heavy equipment is a fork truck, a crane or a track hoe used like a crane.

A fork truck cannot be used to reposition the stick of pipe longitudinally. When the fork truck is used, hand signals from a spotter guide the equipment operator in repositioning the stick of pipe laterally and vertically with respect to the fusion machine. A crane can be operated to reposition the stick of pipe in any direction, including longitudinally, but the stick of pipe can spin and tip about the pickup point and, therefore, needs further guidance from someone on the ground. The person performing this task can also be the spotter, but the operation still requires at least two people and the commitment of the heavy equipment for relatively long periods of time during the pipeline fusion process.

Whatever heavy equipment is chosen, the process itself will be inefficient. Large sticks of pipe are delivered, one at a time, by trucks. Each stick must be lifted from the truck, set on the ground and later lifted from the ground and loaded into the fusion machine. The heavy lifting equipment and its skilled operator must be present throughout the day to load each stick of pipe into the fusion machine. The operator of the lifting equipment is not at a vantage point to see if the pipe is well aligned with the fusion machine, making the loading steps more tedious and time consuming or requiring the additional presence of a spotter. The outboard end of the pipe stick must be set on roller supports so that the pipe stick can move freely axially during the fusion process, but existing roller pipe supports are most often manually adjusted which, for large diameter pipe sticks, can be awkward. Often, the pipe stick is curved, requiring the roller pipe support to be manually re-adjusted for each stick of pipe to be aligned in the fusion machine. The cross sections of the sticks are often not exactly round. The ovality of the stick of pipe should preferably be matched to the pipeline ovality at the junction but, for large diameter pipe sticks, it is very difficult to rotate the stick of pipe to match the pipeline ovality.

It is, therefore, an object of this invention to provide a rack type pipe feeder for a pipe fusion machine which can stage multiple sticks of pipe. Another object of this invention is to provide a rack type pipe feeder for a pipe fusion machine which eliminates the need for dedicated heavy equipment to handle each individual stick of pipe. It is also an object of this invention to provide a rack type pipe feeder for a pipe fusion machine which requires heavy equipment only for the purpose of loading bundles of pipe from a truck onto the feeder. Still another object of this invention is to provide a rack type pipe feeder for a pipe fusion machine which is adjustable to accommodate variations in terrain contour. A further object of this invention is to provide a rack type pipe feeder for a pipe fusion machine which is usable with fusion machines of various sizes. Yet another object of this invention is to provide a rack type pipe feeder for a pipe fusion machine which usable with pipes of various sizes. An additional object of this invention is to provide a rack type pipe feeder for a pipe fusion machine which feeds pipe smoothly into a pipe fusion machine. It is also an object of this invention to provide a rack type pipe feeder for a pipe fusion machine which facilitates easy pulling of pipe through the jaws of the fusion machine into alignment for fusion with next stick of pipe. Still another object of this invention is to provide a means to rotate the pipe in order to match ovality.

SUMMARY OF THE INVENTION

In accordance with the invention, a rack type pipe feeder is provided for use in feeding sticks of pipe to a machine for serial fusion to the trailing end of a pipe. Multiple independent feeders are spaced apart to support bundles of sticks of pipe.

Each feeder has a beam for supporting transversely disposed sticks of pipe. Legs proximate front and rear ends of the beam support the beam above the ground. A jack is used to vary the height of one of the legs so as to set a beam slope at which the transverse sticks of pipe tend to roll toward the lower front end of the beam. Preferably, each leg has a jack.

A roller assembly at the lower end of the beam has a roller aligned for rotation about an axis parallel to the beam. The roller is positioned to receive a stick of pipe as it rolls off the lower front end of the beam.

Preferably, the beam, the legs and the roller assemblies are modular and each leg has a coupling assembly which is co-operable with coupling assemblies on the beam and the roller assemblies to engage the legs to the beam and a roller assembly to either leg. In a preferred leg coupling assembly, an integral pair of J-hooks is aligned back-to-back on a vertical axis of symmetry. Each hook has an upper aperture through it. The coupling assemblies on the beam and roller assembly are substantially the same in configuration. They each have an extending fixed lower pin which can be seated in the bottom of its respective one of the J-hooks, an upper aperture oriented for alignment with the aperture of their respective one of the J-hooks when the lower pin is seated in its respective J-hook and a pin which is manually insertable into and withdrawable from aligned ones of the apertures to lock the legs to the beam and the roller assembly to the front leg.

Most preferably, each leg coupling assembly has a pair of spaced apart plates so that one end of the beam and one side of the roller assembly can be inserted between the plates on opposite sides of the leg. Each plate has an integral pair of apertured J-hooks aligned back-to-back on a vertical axis of symmetry. The beam and roller assembly coupling assemblies each have axially aligned pairs of fixed pins and upper apertures for engagement with their respective J-hooks. A single pin can be inserted through pairs of aligned apertures to lock its leg to its respective beam or roller assembly.

The modular beams may be trusses. A visible level may be fixed to the beam to facilitate setting the slope of the beam. A vertical post may be extended upwardly from a rear portion of the beam to limit rearward roll of sticks of pipe resting transversely on the beam. The post may be interchangeably insertable into one of two receptacles fixed at each end to the beam for receiving and securing the post in its upward orientation relative to the beam.

The roller of each roller assembly is preferably V-tapered to assure stability of the stick of pipe on the rollers. A member may be fixed to the roller assembly forward of the roller to block forward discharge of a stick of pipe from the roller. The blocking member may be a forwardly upwardly angled member. A lever may be pivotally engaged on the roller assembly to raise the roller supporting the stick of pipe, thereby facilitating further maneuverability of the stick of pipe into the fusion machine.

In operation, a plurality of independent pipe racks, usually three such racks, are aligned to support a traversing plurality of sticks of pipe. The heights of the racks are adjusted by use of the jacks to position their rollers to support a received stick of pipe at a level coordinated to the operation of the fusion machine and with the rack beams on slopes which extend upwardly from their rollers at angles at which said sticks of pipe tend to roll toward the rollers. At least one stick of pipe is transversely loaded on the racks. Preferably, loading is accomplished by resting one or more strapped bundles of sticks of pipe on the racks and then cutting the straps. A loaded stick of pipe is then manually urged to roll down the rack slopes onto the rollers. The end of the loaded stick of pipe closest to the fusion machine can be raised slightly, if necessary, using the lever, to properly align the stick with the fusion machine. The loaded stick can then be manually rolled on the rollers into the fusion machine. After the leading end of the manually rolled stick of pipe is fused to the trailing end of the pipeline, the pipeline can be pulled until the trailing end of the fused stick of pipe is positioned for fusion by the fusion machine to the next stick of pipe. The operation is then repeated beginning with the step of manually urging a loaded stick of pipe to roll down the rack slopes onto the rollers.

In another embodiment of the front leg and roller assembly, the roller is journalled for rotation about its longitudinal axis and is contoured to align a pipe resting on the roller for lengthwise travel in a direction transverse to the axis of roller. However, in this embodiment, the axis of rotation of the roller can be hydraulically raised and lowered while the pipe is resting on the roller. A frame has a pivotally connected arm supporting the roller in a horizontal orientation at a radial distance from the frame. A piston and cylinder are connected between pivotal joints on the frame and the arm. The piston and cylinder are hydraulically actuated to pivot the arm up or down so as to orient the pipe for entry into the pipe intake opening of the fusion machine.

In the preferred configuration of this embodiment, the frame pivotally supports a yoke and the yoke rotates about a horizontal axis. The frame is adapted at one end to be free standing and at its other end to be connected to the pipe discharge end of the storage rack. The roller is journalled about its longitudinal axis in the yoke at a radial distance from the horizontal axis of the yoke. The roller is oriented to receive and support a pipe rolling off the pipe discharge end of the storage rack and is contoured to align the pipe received on the roller for lengthwise travel in a direction transverse to the roller rotational axis. The piston and cylinder are connected between pivotal joints on the frame and the yoke. The piston and cylinder are hydraulically actuated to pivot the yoke up or down so as to orient the pipe for entry into the pipe intake opening of the fusion machine.

A drive may also be used to rotate the roller to cause the pipe resting on the roller to travel toward or away from the pipe intake opening of the fusion machine. The drive may be a hydraulic motor and may use the same hydraulic source as the level adjusting piston and cylinder. This source may be the hydraulic source of the pipe fusion machine. A single hydraulic control circuit can be used for both the level adjustment piston and cylinder and the pipe travel drive motor.

The equipment in accordance with the invention for loading sticks of large diameter plastic pipe into a pipe fusion machine includes a pipe storage rack with automated pipe stick dispensers, stands and loaders.

A dispenser discharges pipe one stick at a time from a pipe storage rack to a pipe transfer path. The upstream rack is inclined to gravitationally cause stored sticks of pipe to roll toward and onto the downstream pipe transfer path which is transverse to the direction of roll of the stick on the rack. A V-shaped cam is disposed between the rack and the path. The V-shaped cam is mounted on a transverse shaft so that it can rock between its stick-receiving orientation and its stick discharging orientation. A downstream arm of the V-shaped cam prevents a stick of pipe from gravitationally rolling downstream out of the V-shaped cam onto the transfer path when the cam is in its stick-receiving orientation. An upstream arm of the V-shaped cam prevents a stick of pipe from gravitationally rolling downstream into the V-shaped cam from the rack when the cam is in its stick-discharging orientation. Preferably, a hydraulic cylinder linked to the V-shaped cam selectively drives the V-shaped cam to rock between its stick-receiving and stick-discharging orientations. Preferably, the angular relationship of the downstream and upstream arms of the V-shaped cam is adjustable so as to permit the same cam to be used with pipe sticks of different diameters. For example, the upstream and downstream arms may be engaged for angular realignment on a pivot pin and adapted for fixed engagement in one of at least two angular orientations by a locking pin.

A stand receives a discharged stick of pipe from the dispenser and manipulates the received stick to align with the pipe fusion machine. The stand has a base frame, a trolley adapted to reciprocate laterally on the base frame, a boom adapted to reciprocate vertically on the trolley and an assembly mounted on the boom for receiving and supporting the stick of pipe in a longitudinal orientation transverse to the trolley reciprocation. Preferably, a first hydraulic cylinder linked to the trolley selectively drives the trolley in upstream and downstream directions relative to the pipe feeder and a second hydraulic cylinder linked to the boom selectively drives the boom upwardly and downwardly, so that the stand can adjust the pipe in planar Cartesian coordinates for alignment with the fusion machine. The receiving and manipulating assembly has a sub-assembly adapted to transport the received stick of pipe longitudinally toward and away from the pipe fusion machine. The sub-assembly may also include a drive assembly adapted for reversible propulsion of the sub-assembly to selectively transfer the received stick of pipe longitudinally toward and away from the pipe fusion machine. Thus, the drive assembly effectively converts a stand from planar to spatial Cartesian coordinate manipulation. Preferably, the drive assembly is hydraulic so that the dispenser and the stand can be fully operated using a single hydraulic system.

The transport sub-assembly may, for example, be a V-configured roller assembly, preferred for planar Cartesian coordinate applications, or a V-configured track assembly, preferred for spatial Cartesian coordinate applications. In a two rack system, it is preferred that the stand closest to the fusion machine be a powered track stand and the stand more distant from the fusion machine will be a roller stand without a roller drive.

Use of the racks, dispensers and stands allows a plurality of sticks to be stored on a racks at one time, releasing the heavy lifting equipment and its operator to work elsewhere. The fusion process will require only one operator and the pipe sticks are handled by heavy equipment only once, when delivered pipe is lifted from the truck and placed on the racks. The dispensers load one stick at a time from the racks to the stands by use of gravitational force while retaining the remaining sticks of pipe on the inclined rack. Both the tracked and roller pipe stands are self-powered to align pipe sticks vertically and laterally with the fusion machine. The drive assembly stand can axially drive the pipe in the stands while the non-powered assemblies allow the pipe to move freely axially during the fusion process. The tracks can have open center and also allow the pipe to move axially, substantially freely.

The pipe stick handling machine may also optionally include a damper positioned between the dispenser and the transporter to reduce the force of impact of the discharged stick of pipe on the transporter. The damper may, for example, have a frame supporting a swinging arm which can rotate between an upper angular position to receive the discharged stick of pipe above the transporter and a lower angular position with the discharged stick of pipe resting on the transporter with a hydraulic cylinder applying a variable counter-force to the arm.

BRIEF DESCRIPTION OF THE DRAWINGS

Other objects and advantages of the invention will become apparent upon reading the following detailed description and upon reference to the drawings in which:

FIGS. 5A and 5B are perspective views of the junction of the beam and rear leg of the rack of FIG. 2 showing the leg in lowered and raised positions, respectively;

FIG. 6 is a perspective view of the junction of the beam, front leg and roller assembly of the rack of FIG. 2;

FIG. 11 is a perspective view of the rack of FIG. 10;

FIG. 12 is a perspective assembly view of the rack of FIG. 10;

FIG. 13 is a perspective view of the dispenser of FIG. 10;

FIG. 14 is a perspective assembly view of the dispenser of FIG. 10;

FIG. 18 is a side elevation view illustrating the dispenser of FIG. 10 adjusted for use with small diameter heavy pipe sticks;

FIG. 19 is a side elevation view illustrating the dispenser of FIG. 10 adjusted for use with medium diameter heavy pipe sticks;

FIG. 20 is a side elevation view illustrating the dispenser of FIG. 10 adjusted for use with large diameter heavy pipe sticks;

FIG. 21 is a perspective view of the roller stand of FIG. 10;

FIG. 22 is a perspective assembly view of the roller stand of FIG. 10;

FIG. 27 is a back downstream perspective view of a lowering arm assembly for use with the pipe dispenser and stands;

FIG. 28 is a front downstream perspective view of the lowering arm assembly of FIG. 27;

FIG. 29 is a perspective exploded assembly view of the lowering arm assembly of FIG. 27;

FIG. 32 is a side elevation view illustrating a first phase of operation of the lowering arm assembly of FIG. 27;

FIG. 33 is a side elevation view illustrating a second phase of operation of the lowering arm assembly of FIG. 27; and FIG. 34 is a side elevation view illustrating a third phase of operation of the lowering arm assembly of FIG. 27.

While the invention will be described in connection with preferred embodiments thereof, it will be understood that it is not intended to limit the invention to those embodiments or to the details of the construction or arrangement of parts illustrated in the accompanying drawings.

DETAILED DESCRIPTION

The Feeder

Figure 1:
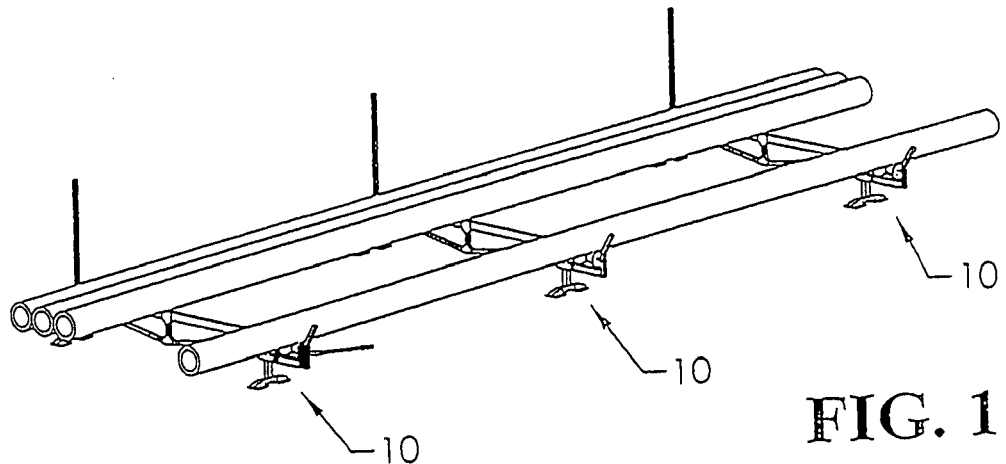
FIG. 1 is a perspective view of a multiple rack feeder supporting a load of sticks of pipe.

Turning to FIG. 1, a rack type pipe feeder 10 is provided for use in feeding sticks of pipe P to a machine (not shown) for serial fusion to the trailing end of a pipeline (not shown). In the use illustrated, three independent rack type feeders 10 are spaced apart to support bundles of the sticks of pipe P. One of the rack type feeders 10 illustrated in FIG. 2. The feeder 10 has a beam 20 for supporting the transversely disposed sticks of pipe P, legs 40 which support the beam 20 above the ground, a roller assembly 70 positioned to receive a stick of pipe P as it rolls off the beam 20 and coupling assemblies 100 to engage the legs 40 to the beam 20 and, depending on the configuration of the feeder 10, to a roller assembly 70. Preferably, the beam 20, the legs 40, the roller assemblies 70 and the couplings 100 are modular so that the feeder 10 has fewer different components and greater flexibility in configuration.

The Beam

Figure 2:
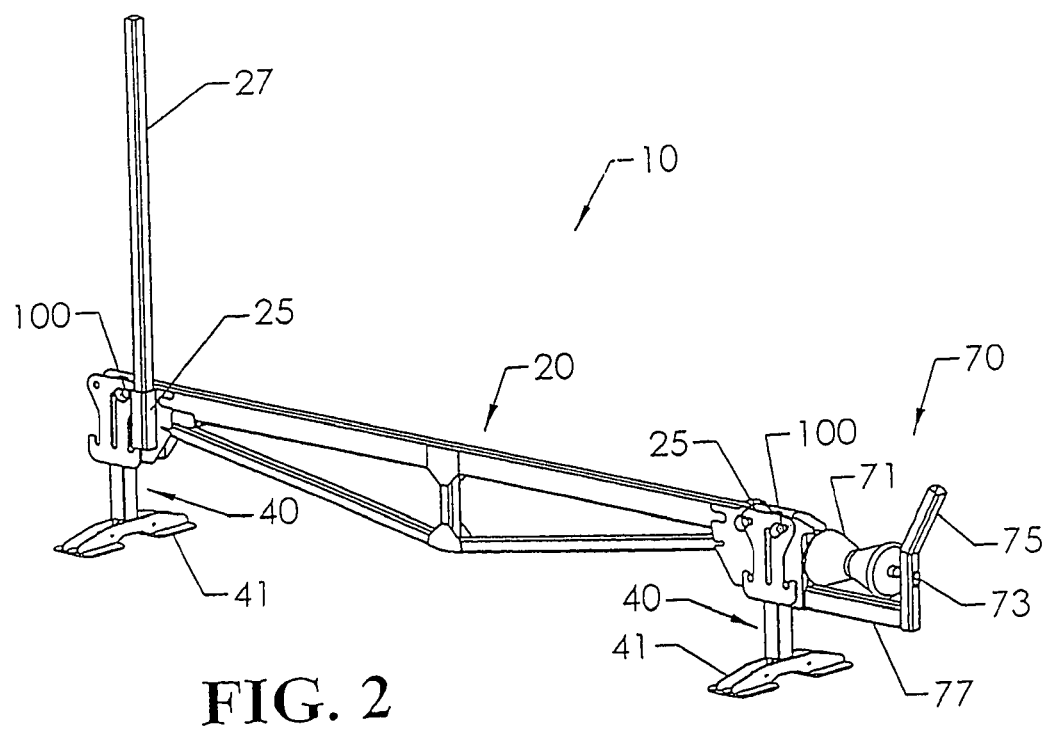
FIG. 2 is a perspective view of one of the racks of the feeder of FIG. 1.
Figure 3:
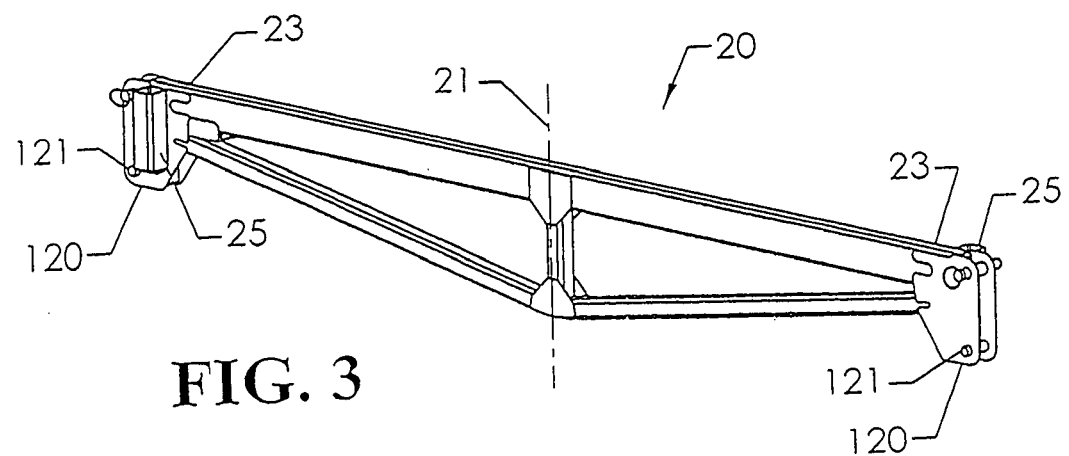
FIG. 3 is a perspective view of the beam of the rack of FIG. 1.

As seen in FIG. 3, the modular beams 20 are preferably trusses so as to afford a high strength-to-weight ratio. The beam 20 is oppositely symmetrical about its vertical center 21. That is, proximate the front and rear ends 23 of the beam 20, vertical tubular receptacles or sockets 25 are welded on opposite sides of the beam 20. As seen in FIG. 2, this permits a vertical post 27 to be extended upwardly from a selected end, or from each end, of the beam 20. Usually, the post 27 will be positioned to limit the rearwardmost roll of the sticks of pipe P on the beam 20 and prevent discharge of a stick of pipe P from the rear of the beam 20, as seen in FIG. 1.

The Legs

The legs 40 support the beam 20 above the ground. They are preferably positioned proximate front and rear ends 23 of the beam 20. As seen in FIGS. 5A and 5B, each leg 40 has a foot 41 and an upright 43. Preferably, each leg 40 has a telescoping upright extension 45 driven by a jack such as the screw jack 47 with a detachable handle 49, by a hydraulic jack or by a similar device. The jack 47 is used to vary the height of the leg 40 to orient the beam 20 on a slope at which the transverse sticks of pipe P tend to roll toward a lower front end 23 of the beam 20. Preferably, each leg 40 has a jack 47 so that the beam level will be easily coordinated with the levels of other beams 20 when multiple feeders 10 are positioned on irregular terrain. As best seen in FIG. 6, a visible level 29, such as a tubular spirit level, may be fixed to the beam 20 to facilitate setting the slope of the beam 20. The slope is set to incline the beam 20 slightly downwardly towards the roller assembly 70 to aid in loading the next stick of pipe P onto the roller assembly 70. The jacks 40 also facilitate raising and lowering the overall level of the beam 20 of the pipe stand to a proper height for feeding a stick of pipe P into the fusion machine (not shown). Thus the same feeder 10 can be used for different pipe diameters and for different sizes of fusion machines. The jacks 40 also permit the feeder 10 to accommodate varying terrain levels at the fusion machine and the racks.

The Roller Assembly

Looking at FIGS. 2 and 3, the lower front end 23 of the beam 20 has a roller assembly 70 with a roller 71 aligned for rotation on an axle 73 parallel to the beam 20. The roller 71 of each roller assembly 70 is preferably V-tapered, as shown, to assure stability of the stick of pipe P on the roller 71. A member 75 may be fixed to the roller assembly 70 forward of the roller 71 to block forward discharge of a stick of pipe P from the roller 71. The blocking member 75 may, as shown, be forwardly upwardly angled from a yoke 77 supporting the roller axle 73. Cast aluminum pipe rollers 71 are preferred.

Figure 7A:
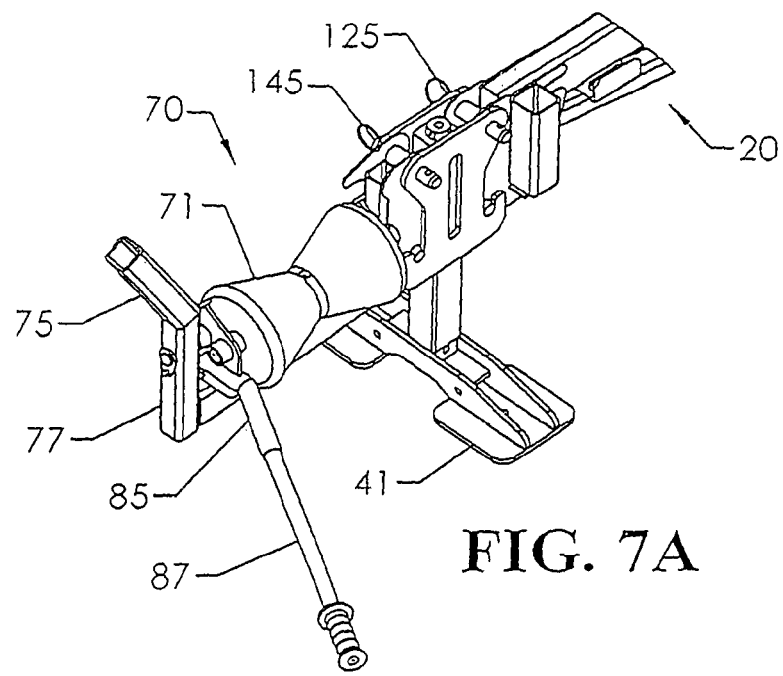
FIG. 7A is a perspective view of a roller assembly lift mechanism.
Figure 7B:
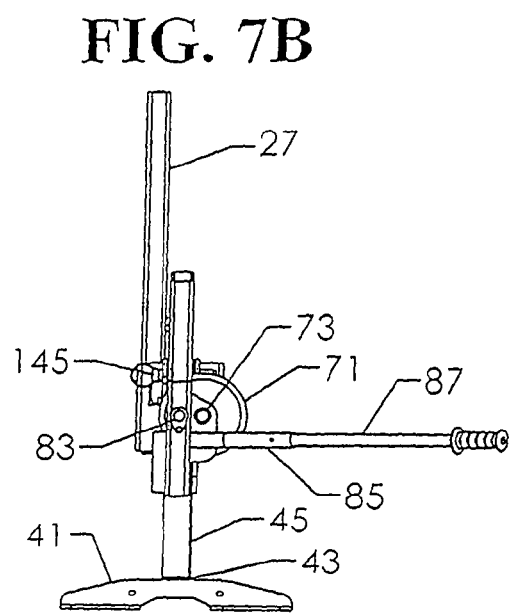
FIGS. 7B and 7C are front elevation views illustrating the normal and lift positions of the mechanism of FIG. 7A.
Figure 7C:
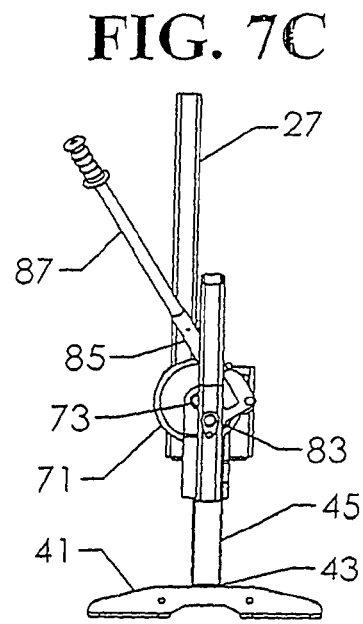

As seen in FIGS. 7A-7C, the roller assembly 70 of the feeder 10 closest to the fusion machine (not shown) may be specially adapted to facilitate feeding the leading end of the stick of pipe P into the machine. This is accomplished by mounting the roller axle 73 eccentrically from the yoke 77 which rotates on a split axle 83. An L-shaped lever 85 is fixed to the split axle 83 and a handle 87 is insertable into the lever 85. As best seen in FIG. 7A, it is preferred to employ two levers 85, one to the front and one to the rear of the roller 71. With the roller axle 73 in a normal eccentric position to the right of the split axle 83 as shown in FIG. 7B, rotation of the handle 87 in a counter-clockwise direction rotates the roller axle 73 about the split axle 83 acurately upwardly and to the left, slightly raising the leading end of the stick of pipe (not shown) above the fusion machine jaw serrations so that the stick of pipe P can be easily pulled through jaws for proper alignment for next fusion. The over center style lift mechanism affords an approximately 14:1 mechanical lifting advantage with the handle 87 installed. Alternatively, other types of mechanical linkages and/or cams can be used to position the lead end of the stick of pipe P in relation to the fusion machine.

The Couplings

Figure 4:
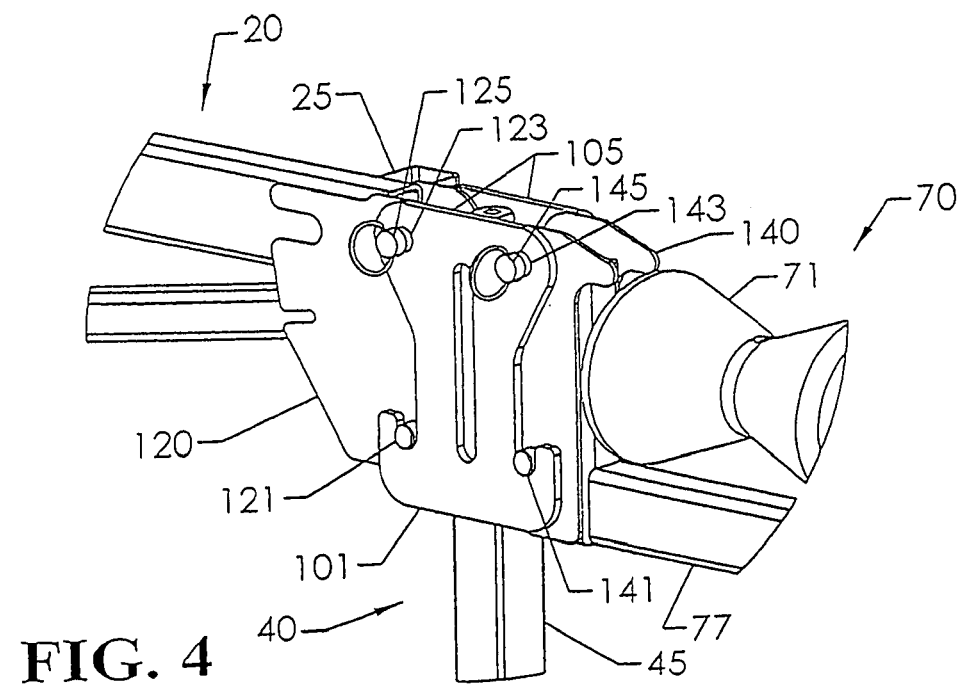
FIG. 4 is a perspective view of the junction of the beam, front leg and roller assembly of the rack of FIG. 2.

As best seen in FIGS. 4-6, a preferred leg coupling assembly 100 has an integral pair of J-hooks 101 aligned back-to-back on a vertical axis of symmetry. Each hook 101 has an upper aperture 103 through it. The coupling assemblies 120 and 140 on the beam 20 and roller assembly 70 are substantially the same in configuration. They each have an extending fixed lower pin 121 or 141 which can be seated in the bottom of its respective one of the J-hooks 101, an upper aperture 123 or 143 oriented for alignment with the aperture 103 of their respective one of the J-hooks 101 when the lower pin 121 or 141 is seated in its respective J-hook 101 and a pin 125 or 145 which is manually insertable into and withdrawable from aligned ones of the apertures 103 and 123 or 143 to lock the leg 40 to the beam 20 and the roller assembly 70 to the front leg 40.

Most preferably and as shown, each leg coupling assembly 100 has a pair of spaced apart plates 105 so that one end of the beam 20 and one side of the roller assembly 70 can be inserted between the plates 105 on opposite sides of the leg 40. Each plate 105 has an integral pair of apertured J-hooks 101 aligned back-to-back on a vertical axis of symmetry. The beam and roller assembly coupling assemblies 120 and 140 each have axially aligned pairs of fixed pins 121 or 141 and upper apertures 123 or 143 for engagement with their respective J-hooks 101. A single pin 125 or 145 can be inserted through pairs of aligned apertures 103, 123 or 143, 123 or 143 and 103 to lock its leg 40 to its respective beam 20 or roller assembly 70.

Hydraulic Embodiment

Figure 8A:
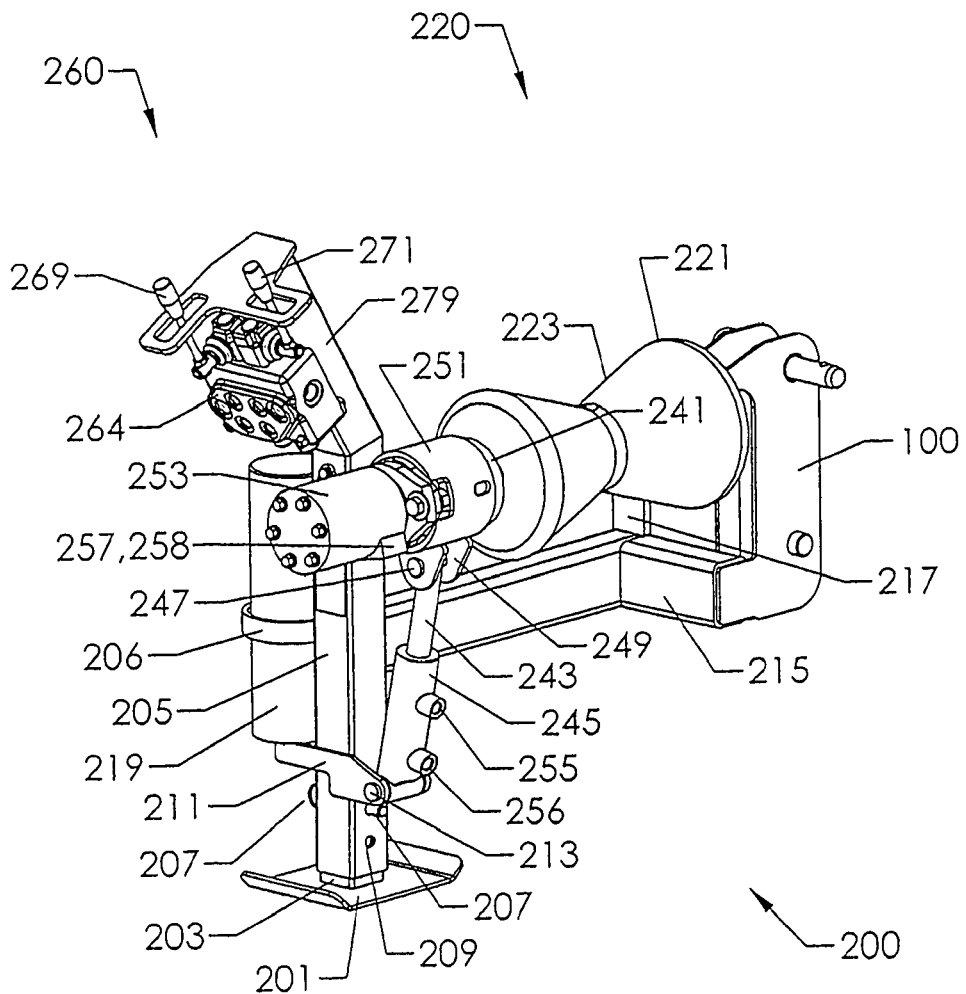
FIGS. 8A, 8B and 8C are perspective views of a hydraulic embodiment of the front leg and roller assembly.
Figure 8B:
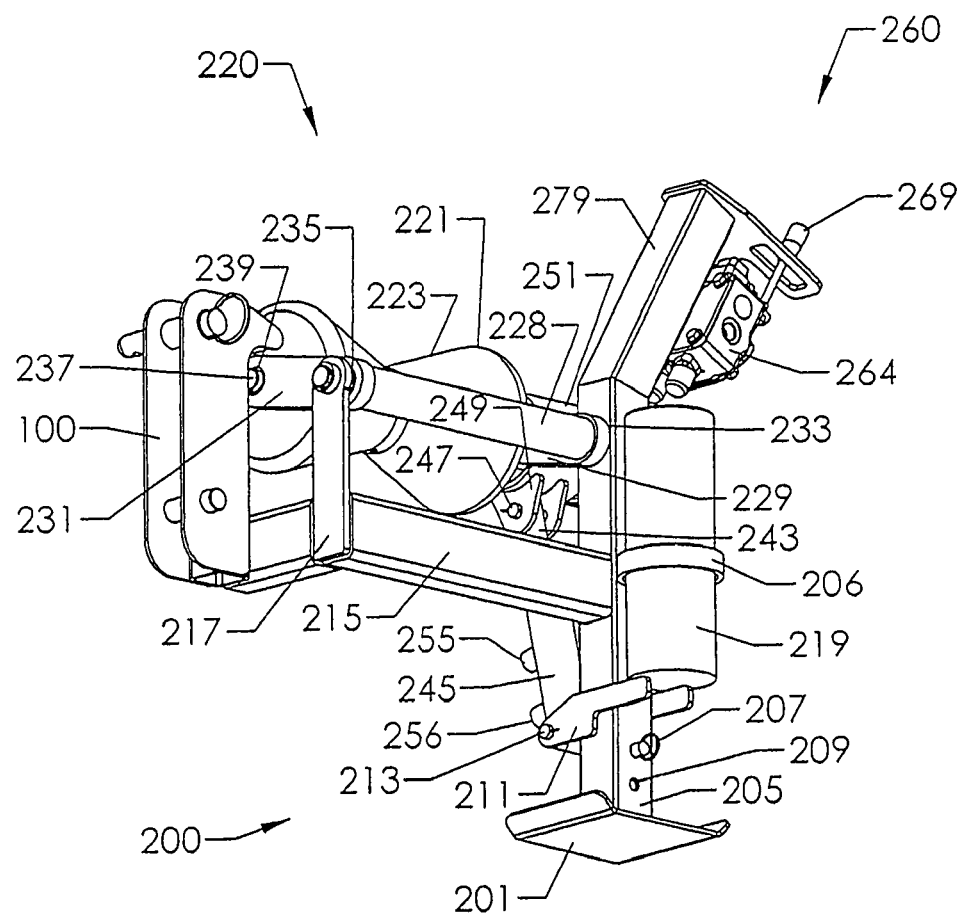
Figure 8C:
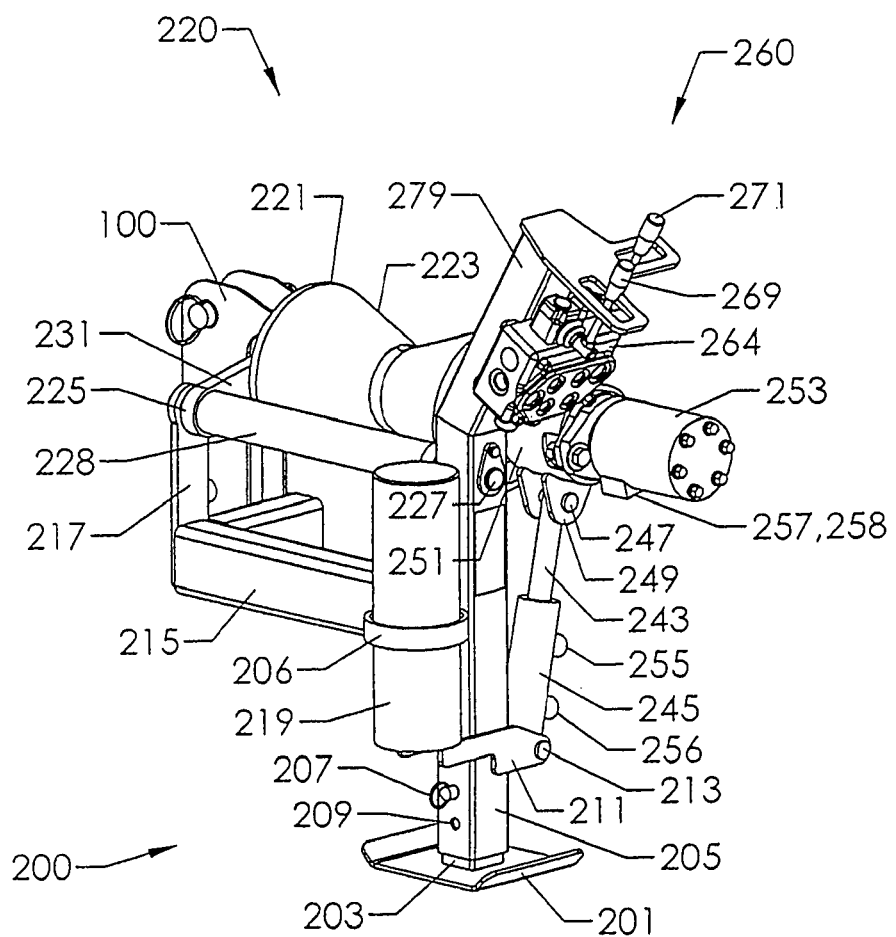

Turning to FIGS. 8A, 8B and 8C, a hydraulic embodiment of a front leg 200 and roller assembly 220 of the pipe rack is illustrated.

The leg 200 supports the beam 20 above the ground. It has a foot 201 and an upright 203. Preferably, and as shown, the upright 203 supports a telescoping tubular extension 205 which can be manually raised and lowered to adjust the height of the leg 200. The leg 200 can be locked at a selected height by insertion of a pin 207 into aligned apertures 209 in the upright 203 and telescoping extension 205 when the desired height is set. A clevis 211 is welded to a lower portion of the telescoping extension 205 to support a clevis pin 213. A horizontal L-shaped frame 215 of tubular members is welded at one end to and extends away from the telescoping extension 205 at a point above the clevis 211. The frame 215 extends from the telescoping extension 205 in a direction parallel to the clevis pin 213 and then turns in the same direction as the clevis 211 extends from the telescoping extension 205. A post 217 extends upwardly from the apex of the L-shaped frame 215.

The roller assembly 220 has a roller 221 which is journalled for rotation about its longitudinal axis. The roller 221 has a contour 223, preferably V-tapered, to align a pipe P resting on the roller 221 for lengthwise travel in a direction transverse to the axis of roller 221. A yoke 225 has a shaft 227 and a pair of radial arms 229 and 231. The shaft 227 extends through a pipe section 228 and is journalled at its ends in bearings 233 and 235 at the upper ends of the telescoping extension 205 and the post 217, respectively. The yoke shaft 227 is parallel to the clevis pin 213 and, as shown, substantially horizontal. The roller shaft 237 is journalled in bearings 239 and 241 in the yoke arms 229 and 231 at a radial distance from the horizontal axis of the yoke shaft 227. A piston 243 and cylinder 245 are pivotally connected between the clevis pin 213 on the telescoping extension 205 of the frame and the clevis pin 247 of another clevis 249 mounted on a housing 251 welded to the arm 229 of the yoke 225 adjacent to the hydraulic motor 253.

The L-shaped frame 215 has the leg 200 at one end and has a coupling assembly 100 as described in relation to FIGS. 4-6 at its other end for connection to the pipe discharge end of the storage rack. The roller 221 is oriented to receive and support a pipe P rolling off the pipe discharge end of the storage rack as seen in FIG. 1 and is contoured to align the pipe P received on the roller 221 for lengthwise travel in a direction transverse to the roller rotational axis. The piston 243 and cylinder 245 are hydraulically actuated to pivot the yoke 225 up and down so as to orient the pipe P for entry into the pipe intake opening of the fusion machine (not shown). The roller shaft 227 is driven by a reversible hydraulic motor 253 to cause the pipe P resting on the roller 221 to travel toward or away from the pipe intake opening of the fusion machine (not shown).

Figure 9:
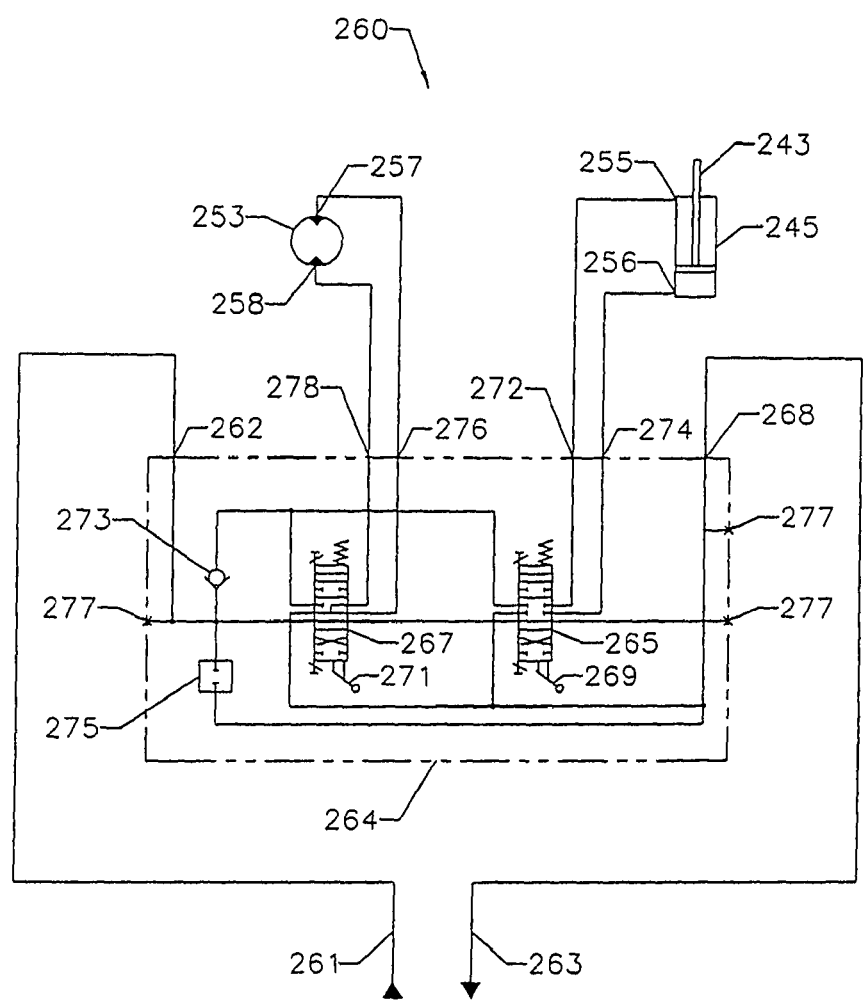
FIG. 9 is a schematic diagram of the hydraulic system of the hydraulic embodiment of FIGS. 8A, 8B and 8C.

Preferably, the hydraulic source for the pipe level adjusting piston 243 and cylinder 245 and for the pipe travel roller motor 253 are the same, most preferably the hydraulic source of the pipe fusion machine. As seen in FIG. 9, a single hydraulic control system 260 can be used. As shown, inlet and outlet lines 261 and 263 of the system 260 are connected to the fusion machine hydraulics (not shown). A two spool valve 264 has sections 265 and 267 operated by separate valve hand levers 269 and 271 for the lift cylinder 245 and roller motor 253, respectively. As shown, the hydraulic input line 261 is connected through the valve inlet port 262 and a check valve 273 to the valve sections 265 and 267. The valve sections 265 and 267 are connected through the valve outlet port 268 to the hydraulic return line 263. The valve ports 272 and 274 of the lift cylinder valve section 265 are connected to the lift cylinder ports 255 and 256, respectively, and the valve ports 276 and 278 of the roller motor valve section 267 are connected to the motor ports 257 and 258, respectively. As shown, a standard two spool valve 264 is adapted for the purpose of this system 260 by use of a closed valve plug 275 and by plugging the unused ports 277 of the valve 264.

Returning to FIGS. 8A-C, the hydraulic control system 260 is mounted on the member 279 which is welded to and extends forwardly and upwardly from the top of the telescoping extension 205. Thus, the angled member 279 also serves as a block to forward discharge of a stick of pipe P from the roller 221, as hereinbefore seen in relation to FIGS. 2 and 3.

Operation

Returning to FIG. 1, multiple independent feeders 10, usually three, are assembled with a roller assembly 70 at the front end of the beam 20 and a vertical post 27 at the rear end of the beam 20. The feeders 10 are aligned to support a traversing plurality of sticks of pipe P. The heights of the beams 20 are adjusted by use of the jacks 47 to position their rollers 71 to support a received stick of pipe P at a level coordinated to the operation of the fusion machine (not shown) and with the beams 20 on slopes which extend upwardly from their rollers 71 at angles at which said sticks of pipe P tend to roll toward the rollers 71. Preferably, loading is accomplished by resting one or more strapped bundles of sticks of pipe P on the beams 20 and then cutting the straps. A loaded stick of pipe P is then manually urged to roll down the beam slopes onto the rollers 71. The end of the loaded stick of pipe P closest to the fusion machine can be raised slightly, if necessary, using the lever 85 and handle 87, to raise the stick of pipe P above the level of the fusion machine. The raised stick of pipe P can be easily pushed into the fusion area of the machine and then lowered to the fusion machine height. After the leading end of the manually rolled stick of pipe P is fused to the trailing end of the pipeline, the pipeline can be pulled until the trailing end of the fused stick of pipe P is positioned for fusion by the fusion machine to the next stick of pipe P. The operation is then repeated beginning with the step of manually urging a loaded stick of pipe P to roll down the beam slopes onto the rollers 71.

If a hydraulic embodiment of the front leg 220 and roller assembly 240 is used at the pipe discharge end of the closest feeder 10 to the pipe fusion machine (not shown), the pin 207 is used to lock the telescoping tubular extension 205 of the leg 200 so as to prevent the weight of the pipe P on the roller 221 as closely as possible to the height-wise alignment with the pipe intake opening of the fusion machine (not shown) to guard against tipping of the roller assembly 240 by the weight of the pipe P. The roller motor valve lever 271 is operated in forward or reverse positions to advance or withdraw the pipe P toward or from the fusion machine pipe intake opening. The operator can exert slight downward manual pressure on the pipe P against the roller 221 as necessary to assist the travel of the pipe P. As the pipe P draws close to the opening, if the pipe P is not properly elevated to align with the intake opening of the fusion machine, the roller motor lever 271 is retuned to a neutral condition and the nearest level to the lift cylinder valve lever 269 is operated in up or down positions to raise or lower the pipe P to align with the fusion machine pipe intake opening. Once aligned, the lift cylinder lever 269 is retuned to a neutral condition and the roller motor valve lever 271 again operated in forward position to advance the pipe P into the fusion machine pipe intake opening. As seen in FIGS. 8A-C, a ring 206 is welded to the telescoping extension 205 above the clevis 211. A canister 219 which slides into the ring 206 and seats on the clevis 211 can be used to store the operating instructions for the hydraulic system.

Using the modular system herein described, multiple beams 20 can be serially connected by legs 40 to afford an extended length beam sloped from one end to the other. Furthermore, roller assemblies 70 can be connected at each end of such an extended beam so that a single beam system can be used to serve two separate fusion machines, one on either side of the feeder.

Heavy Pipe Handling System

A powered and controlled system for small, medium and large diameter heavy pipe sticks P stores, dispenses, feeds and aligns sticks of pipe P with a pipe fusion machine (not shown).

Figure 10:
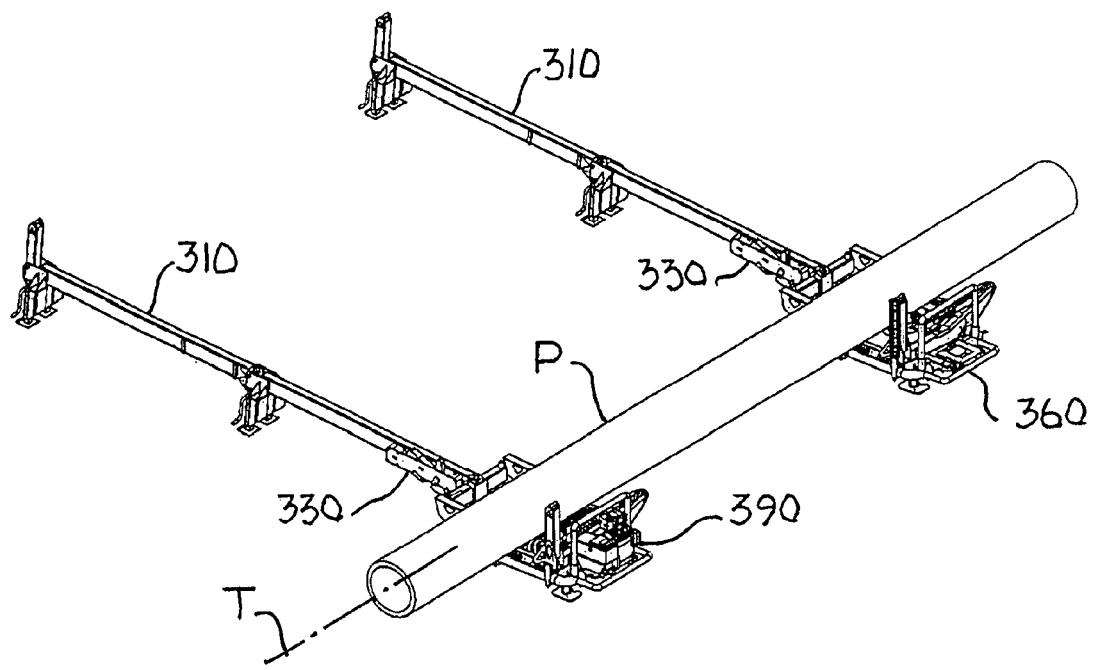
FIG. 10 is a perspective view of an embodiment of a pipe handling system for heavy pipes including an assembled pipe rack, dispenser and powered track stand and an assembled pipe rack, dispenser and roller stand.

Turning first to FIG. 10, racks 310 are used to store the sticks of pipe P until they are gravity fed to the dispensers 330. As shown, a two rack set will store one layer of pipe sticks P ranging from 20" to 48" in diameter, as seen in FIGS. 18-20. The dispensers 330 are positioned on the downstream ends of the racks 310. They hold back the stored pipe sticks P and discharge one stick P at a time to a transfer path T, as seen in FIG. 10, formed by pipe stands. As shown, one stand is a roller stand 360 and the other is a powered track stand 390. Each dispenser 330 is adjustable to accommodate the diameter of the pipe sticks P being dispensed. The pipe stands 360 and 390 are powered to shift loaded pipe sticks P laterally and vertically and, if desirable, can be powered to drive the pipe sticks P in their longitudinal axial directions. The lateral and vertical movements are used to align the pipe sticks P with the fusion machine. The axial movement is used to move the pipe sticks P into the fusion machine jaws and register it at the desired location.

Looking at FIGS. 11 and 12, in the two rack system shown, each rack 310 has two beams 311 in tandem on which the pipe sticks P will be stored. As shown, the upstream end of each beam 311 is supported by legs 313. The downstream end of each beam 311 has a coupling 315 and the upstream end of each beam 311 has a coupling 317 with two downwardly depending tubular posts 319. Each tubular post 319 receives an upstream leg 313 and paired legs 313 include adjustable synchronized screw jacks 321 which are used to angle their beam 311 approximately 3 to 5° from horizontal so the sticks of pipe P will roll by gravity towards the pipe stands 360 and 390. The downstream couplings 315 of the upstream beams 311 engage with the upstream couplings 317 of the tandem downstream beams 311 and are held in place by a pin 323. The downstream couplings 317 of the downstream beams 311 are each connected to a transverse extension beam 325 with downwardly extending plugs 327 which will engage with their respective pipe stands 360 or 390. An upright stanchion 329 mounted on the most upstream coupling 317 prevents the pipe sticks P from inadvertently rolling off the upstream ends of the racks 310. A protractor and plum bob (not shown) can be mounted on the side of each beam 311 to assist with adjusting the rack angles. The dispenser 330 is mounted on the side and at the most downstream end each rack 310. While a tandem of two beams 311 per rack 310 is illustrated, one or more beams 311 can be used depending on the required pipe storage capacity. Preferably, the rack beams 311 are tubular to provide good lateral stability against torsional buckling.

Looking at FIGS. 13-14, each dispenser 330 has a V-shaped cam 331 with upstream and downstream arms 333 and 335. The cam 331 rocks on a pivot pin 337 extending between a pair of plates 339 held in spaced relationship by sets of spacer tubes and bolts 341. Preferably, a hydraulic cylinder 343 is linked between the plates 339 and the cam 331 by pins 345 to rock the cam 311. The hydraulic cylinder 343 actuates the cam 331.

Figure 15:
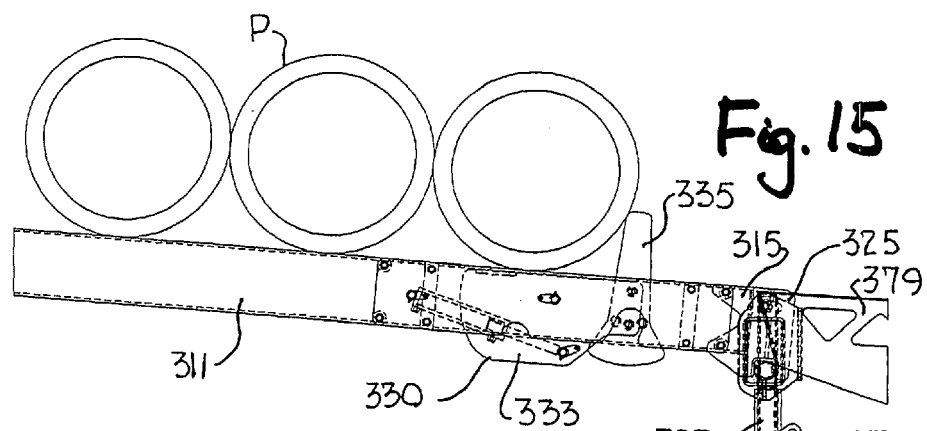
FIG. 15 is a side elevation view illustrating the operation of the dispenser of FIG. 10 rocked to its pipe receiving orientation.
Figure 16:
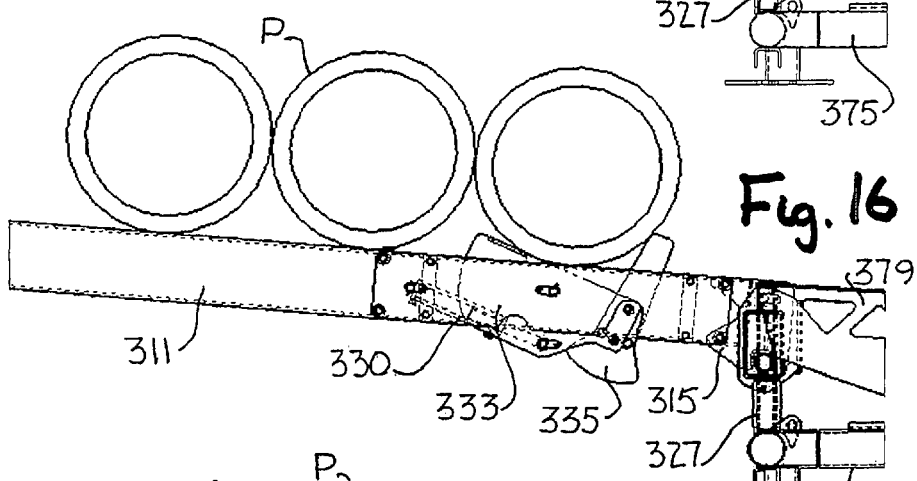
FIG. 16 is a side elevation view illustrating the operation of the dispenser of FIG. 10 between its pipe receiving and pipe discharging orientations.
Figure 17:
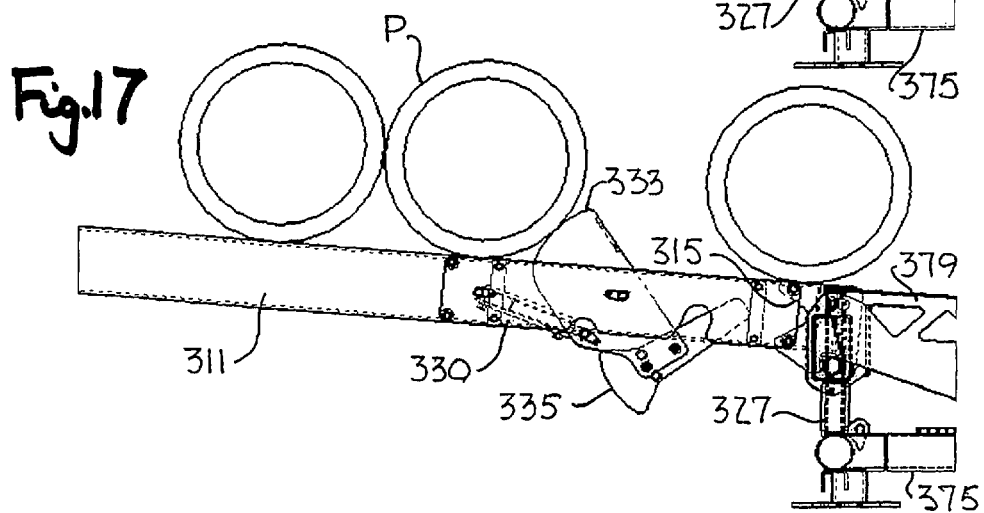
FIG. 17 is a side elevation view illustrating the operation of the dispenser of FIG. 10 rocked to its pipe discharge orientation.

As seen in FIGS. 15-17, the cam 331 can be rocked to lower the upstream arm 333 to the level of the rack 310 to admit one stick of pipe P at a time into the cam 331 or to raise the upstream arm 333 above its rack 310 to hold the upstream pipe sticks P on the rack 310 against the downstream gravitational force. When the upstream arm 333 is lowered to admit a stick of pipe P into the cam 331, the downstream arm 335 is raised to prevent the received stick of pipe P from being released from the cam 331. To dispense the stick of pipe P from the cam 331 to a downstream pipe stand 360 or 390, the cam 331 is rocked to lower the downstream arm 335 to discharge the pipe stick P from the cam 331 while the upstream arm 333 is simultaneously raised to prevent the next stick of pipe P from rolling into the cam 331. Thus, as the cam 331 is rocked downstream, a stick of pipe P is discharged from the cam 331 to the pipe stand 360 or 390 and, as the cam 331 is rocked upstream, the next stick of pipe P is received in the cam 331. Each rack 310 has its own dispenser 330 and the dispensers 330 are synchronized in their rocking by a hydraulic flow divider, as hereinafter explained.

Returning to FIGS. 13 and 14, the upstream and downstream arms 333 and 335 of the cam 331 are formed using pairs of spaced apart plates 347 and 349, respectively. Preferably, the plates 347 and 349 have matching pivot holes 351 for receiving a pivot pin 353. Also, one of the arms 333 or 335, as shown the upstream arm 333, will have single angle adjustment holes 355 and the other of the arms 333 or 335, as shown the downstream arm 335, will have multiple angle adjustment holes 357. A pin 359 can be inserted through the single adjustment holes 355 and an aligned pair of the multiple adjustment holes 357 to set the angle between the upstream and downstream arms 333 and 335. The adjustment changes the distance between the extremities of the arms 333 and 335 of the cam 331 so that the upstream arm 333 can rise up between the stick P being dispensed and the next stick P for different pipe stick diameters.

As seen in FIGS. 18-20, a three adjustment hole cam 331 can allow for use of the same pipe stick dispenser 330 with a wide range of pipe stick diameters. While FIGS. 18-20 illustrate small, medium and large diameter heavy pipe sticks P, each size is intended as being illustrative of a range of pipe stick diameters and the same dispenser 330 can be used, for example, for pipe sticks P of any diameter ranging from 8" to 48".

Looking at FIGS. 21 and 22, the roller pipe stands 360 have a roller assembly 361 with a pair of rollers 363 arranged in a V-configuration to support and retain the pipe stick P. The roller assembly 361 is mounted on a boom 365 which is raised and lowered by hydraulic cylinders 367. The boom 365 is pivotally mounted on a trolley 369 with wheels 371 which ride on rails 373 of a base frame 375. The trolley 369 is reciprocally laterally driven by a hydraulic cylinder 377 which pushes and pulls the trolley 369 on the base frame 375.

The trolley 369 has two transfer ramps 379 which will be positioned one on either side of the rack 310, as seen in FIGS. 15-17. The ramps 379 ensure that the pipe stick P rolls from the rack 310 to the roller assembly 361 even if the trolley 369 is laterally positioned away from the rack 310. A stanchion 381 is mounted in a pair of sockets 383 on the opposite side of the trolley 369 from the rack 310 to ensure that, when a pipe stick P is dispensed from the rack 310 to the roller assembly 361, it does not continue on past the trolley 369. Another pair of sockets 383 on the upstream side of the frame 375 receives the plugs 327, seen in FIGS. 11 and 12, on the downstream end of the rack 310. A scale and pointer 385 facilitate coordination of the elevation of the pipe stick P with the fusion machine intake (not shown). A platform 387 mounted on the frame 375 is used to support associated equipment, as will be seen in relation to FIGS. 23 and 24. The roller pipe stand 360 permits powered lateral and vertical adjustments of the orientation of the pipe stick P and facilitates longitudinal motion of the pipe stick P along the pipe stick transfer path to the fusion machine (not shown).

Figure 23:
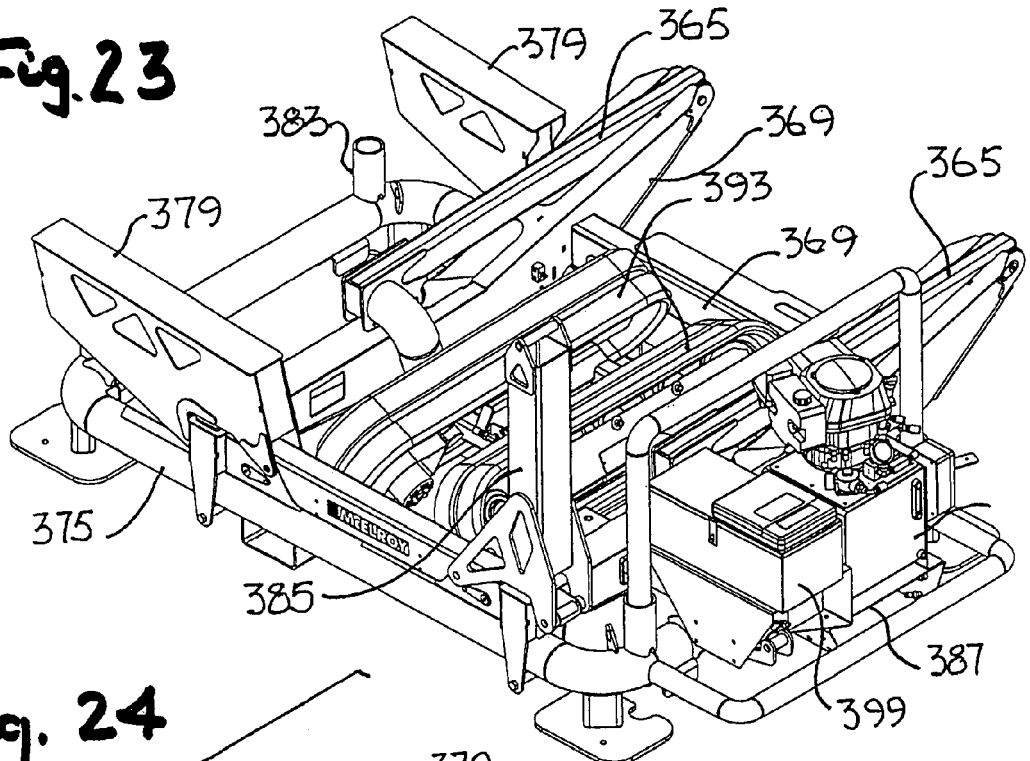
FIG. 23 is a perspective view of the powered track stand of FIG. 10.
Figure 24:
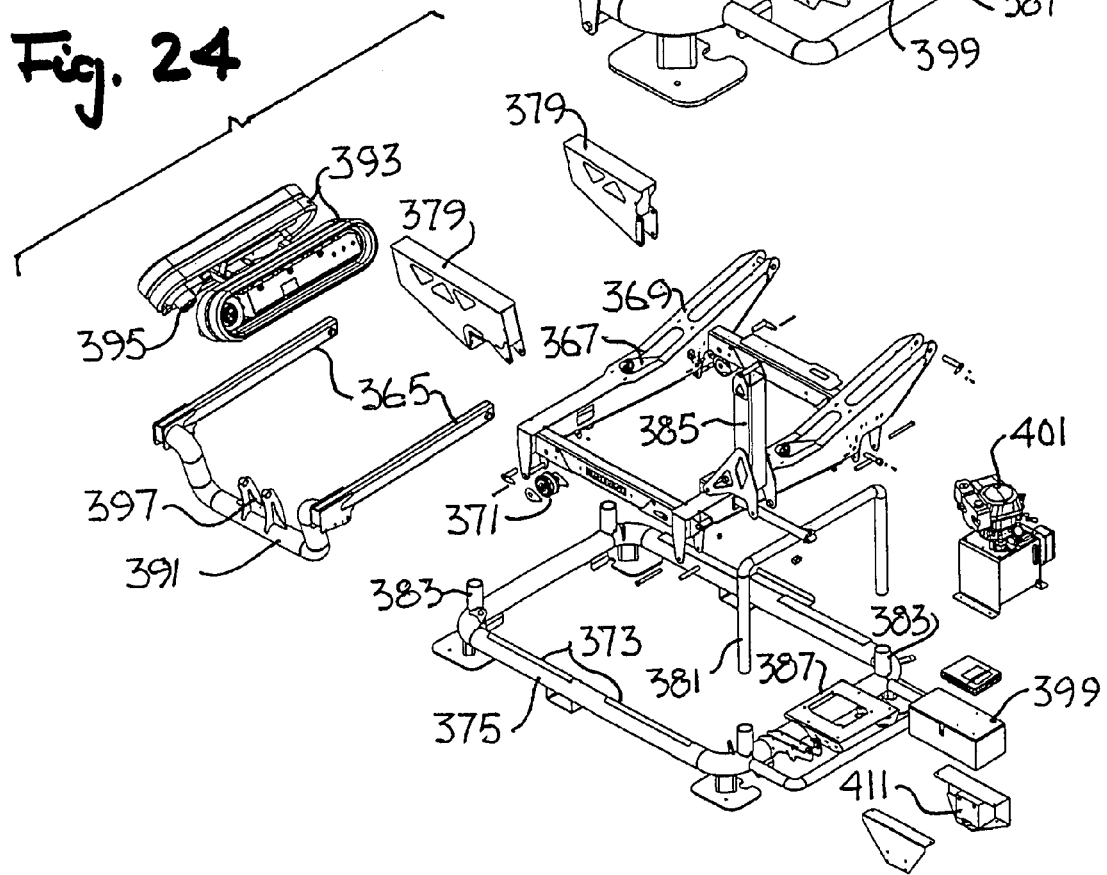
FIG. 24 is a perspective assembly view of the powered track stand of FIG. 10.

Looking at FIGS. 23 and 24, the tracked pipe stands 390 are similar in many respects to the roller pipe stands 360 and similar components have been have been designated by the same element numbers. The primary difference is that the roller assemblies 361 have been replaced by track assemblies 391 in which a pair of rubber tracks 393 are arranged in a V-configuration to support and retain the pipe stick P. The tracks 393 are driven, preferably by hydraulic motors 395, to move the pipe stick P axially, into and out of the fusion machine jaws (not shown). The track assembly 391 is pivotally mounted on the boom 365. The track assembly pivot mount 397 allows the tracks 393 to stay aligned with and maintain firm contact with the pipe stick P as the boom 365 moves up and down or the pipe stick P angles up or down. The platform 387 of the tracked pipe stand 390 can be used to carry a pendant storage box 399 and the hydraulic power unit 400 hereafter described in relation to FIGS. 25 and 26.

Figure 25:
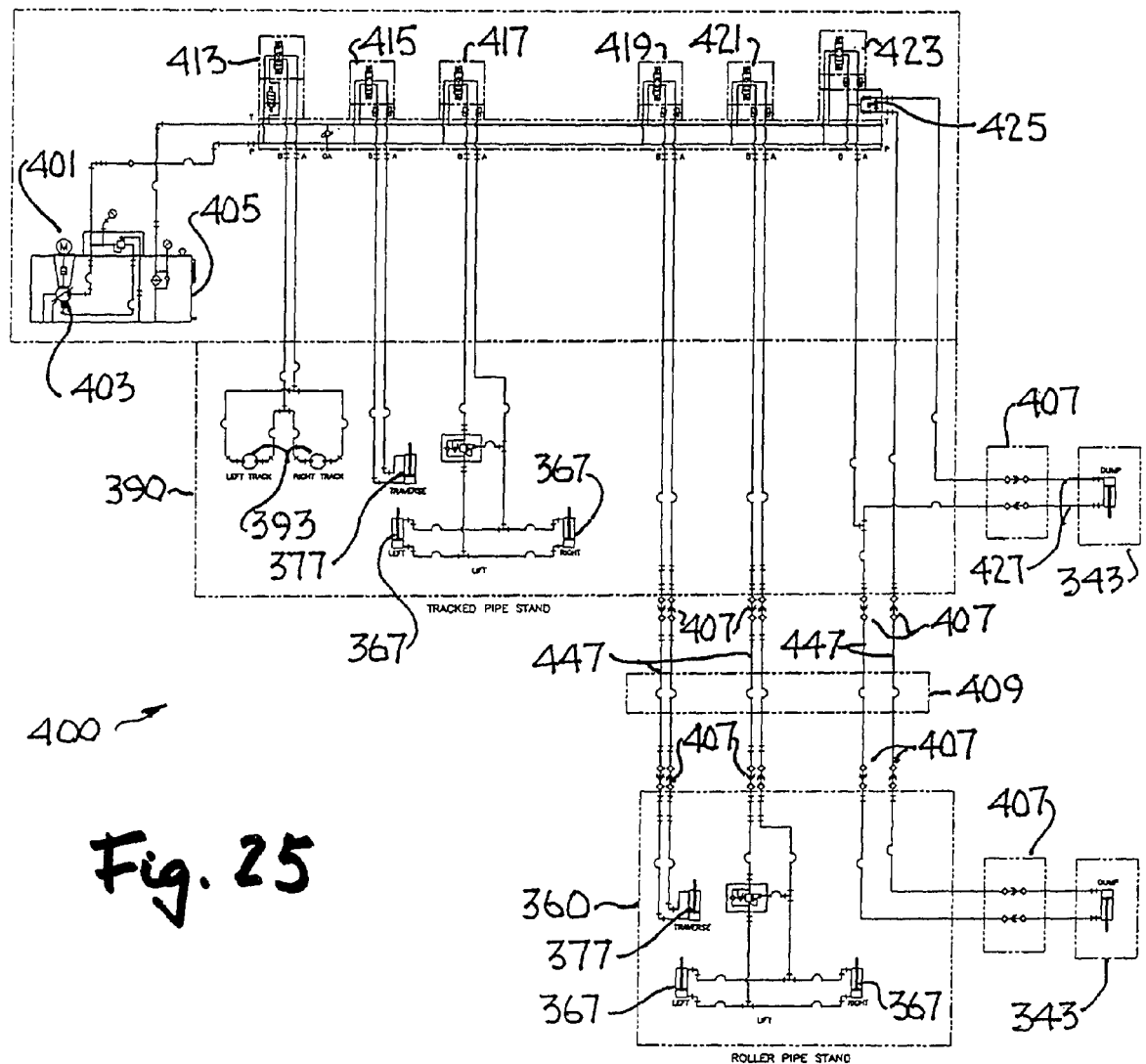
FIG. 25 is a schematic diagram of the hydraulic system of the heavy pipe embodiment of FIGS. 10-26.
Figure 26:
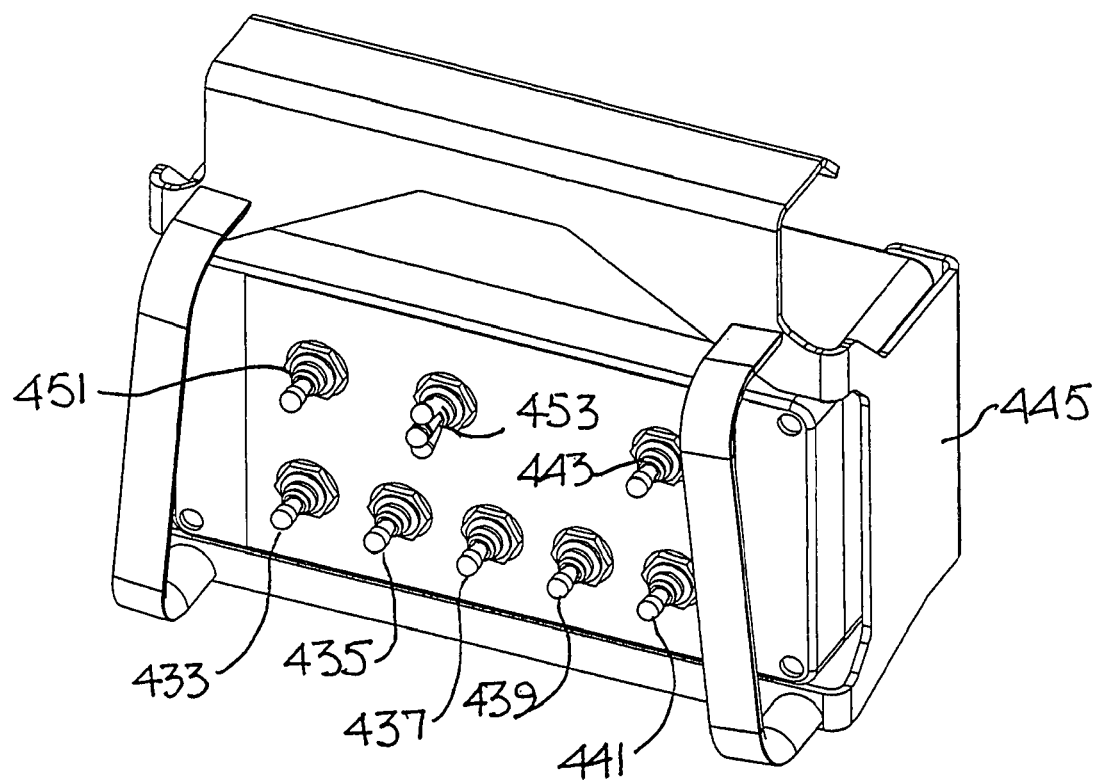
FIG. 26 is a perspective view of an operator pendant for use with the system of FIG. 10.

Turning to FIG. 25, the hydraulic power and control 400 for the dispensers 330 and stands 360 and 390 includes the engine 401, the pump 403, the reservoir 405 and quick disconnects 407 and an extension hose kit 409 for the dispensers 330 and the tracked and roller pipe stands 390 and 360. The engine 401 is preferably an electric start gasoline engine with its own 12 volt battery 411. The powered movements are controlled by six 12 volt electric solenoid valves 413, 415, 417, 419, 421 and 423 for the tracks 393, the track trolley cylinder 377, the track boom cylinders 367, the roller trolley cylinder 377, the roller boom cylinders 367 and the dispenser cam cylinders 343, respectively. The cam cylinders 343 are synchronized by a flow divided 425 and served by dump hoses 427. Looking at FIG. 26, the valves 413, 415, 417, 419, 421 and 423 are controlled by toggle switches 433, 435, 437, 439, 441 and 443, respectively on the operator's pendant 445 which has a cable (not shown) extending to the tracked pipe stand 390. The roller pipe stand 360 is controlled by, or is a slave of, the valves on the tracked pipe stand 390. Six extension hoses 447 with quick disconnects 407 are run from the tracked pipe stand 390 to the roller pipe stand 360 for roller trolley motion, roller boom motion and dispenser rocker cam operation. The pendant 445 also has a choke toggle switch 451 and a three position start/run/off toggle switch 453 for the engine 401.

In operation, the tracked pipe stand 390, the roller pipe stand 360, the pipe racks 310 and the fusion machine (not shown) are placed in desired spatial location. The desired incline of the racks 310, in a range of 3-5°, is set using the screw jacks 321. The extension hoses 447, dispenser cam hoses 427 and pendant 445 are connected. Sticks of pipe P are loaded onto the racks 310 and any bundle bands are cut. The operator stands at the fusion machine (not shown) and uses the pendant controls 451 and 453 to start the engine 401. The pipe stands 360 and 390 are positioned by lowering their booms 365 and 395 and preferably moving their trolleys 369 as close as possible to the racks 310. The dispensers 330 are actuated by their switch 443 to feed one stick of pipe P. If a pipe stick P is not already loaded in the cams 331 against their downstream arms 335, the dispensers 330 are cycled to rock fully upstream to place one stick P against the downstream arms 335 and then rocked fully downstream to discharge the received stick P from the cams 331. The cams 331 should then be left in the discharge position with the upstream arms 333 of the cams 331 up. The pipe stand tracks 393 and rollers 363 are then moved laterally and vertically to approximately align the pipe stick P for insertion into the fusion machine jaws (not shown). The pipe stick P to be inserted should be slightly above the jaws centerline. The fusion machine's pipe lift roller (not shown) is then raised, if necessary, to accept the pipe stick P being loaded. Using the track drive control switch 433, the pipe stick P is inserted into the fusion machine jaws to the desired location. At the same time, the tracks 393 and rollers 363 can be further adjusted as needed laterally and vertically to maintain approximate alignment in the fusion machine jaws. The fusion machine pipe lift roller (not shown) is then lowered and the tracks 393 are fully lowered. The pipe stand rollers 363 are moved laterally and vertically to precisely align the pipe stick P with the jaws. The engine 401 can then be turned off, the fusion machine jaws closed and the fusion process performed.

Since the fused pipeline is not easy to rotate, rotating the pipe stick P on the stands 360 and 390 is desirable for a variety of reasons, such as to match the ovality of the pipe stick P to the end of the pipeline to which it is to be fused, to match print line information markings on the pipe stick P, to put the print lines facing upward or, for a curved stick of pipe, to make its end and the end of the fused pipe stick tangent (not mitered) or to place its curve in the same orientation as a curved path the buried pipeline will follow. This can be done by positioning the end of the pipe stick P over the fusion machine's pipe stand roller (not shown). The tracks 393 are then lowered so the pipe stick P rests on the fusion machine's pipe lift roller. Once below and free of the pipe stick P, the tracks 393 can be moved laterally but not so much that either track 393 goes past the center of the pipe stick P. The tracks 393 can then be raised and one track or the other contacts the stick of pipe P first. The tracks 393 are continued to be raised and as the pipe stick end is lifted off the support of the fusion machine jaws or pipe roller (not shown), it rolls down into the V of the tracks 393 and is thereby rotated. The other end of the pipe stick P, supported on the pipe stand rollers 363, slips on the rollers 363 allowing the rotation. The process is repeated until the pipe stick P is rotated enough that the ovality matches. Alternatively, with the boom raised and supporting the stick of pipe P, at least one horizontal beam can be spaced below and extending laterally in relation to the pipe stick P. The trolley can be shifted in a direction opposite the direction the pipe stick P is to be rotated to reposition the pipe stick P above the horizontal beam. The boom is then lowered until the pipe stick P is oriented within the V-shape of the boom but rested only on the horizontal beam. The trolley is again shifted but in the direction the pipe stick P is to be rotated to roll the pipe stick P along the horizontal beam. Shifting is terminated upon the first to occur of reaching the desired rotational orientation of the pipe stick P and reaching the end of the horizontal beam. The boom is then raised until the pipe stick P is spaced above the horizontal beam. The steps of shifting, lowering, shifting, terminating and raising are repeated until the desired rotational orientation of the pipe stick P is achieved.

The pendant 445 can be a wireless remote. The operation can be under semi-automated control so that the push of one button will lower both tracked and roller booms 395 and 365 fully, moves both tracked and roller trolleys 369 toward the racks 310, dumps a stick of pipe P and then moves the trolleys 369 and booms 395 and 365 over and up to a predetermined position that is in approximate alignment with the fusion machine, the approximate alignment being done by position sensors that remember the trolley 369 and boom 395 and 365 positions manually set by the operator. It could further include moving the pipe stick P axially into the fusion machine to the desired position.

Lowering Arm Assembly

In some applications, and particularly those in which pipe stands 360 and/or 390 will be used to receive pipe sticks P in their higher range of pipe weight handling ability, it may be desirable to dampen the impact of pipe sticks P released from the racks 310 to the stands 360 and/or 390. Looking at FIGS. 27-29, a lowering arm assembly 500 is illustrated which can be used to provide the desired impact dampening.

The assembly 500 includes a generally upstanding frame 501, as shown consisting of a pair of parallel plates 503 with spacers 505 therebetween. An arm 507, preferably and as shown having an elbow 509, is pivotally mounted at the top of its upper arm 511 on a pin 513 which extends through apertures 515 on the upper portion of the frame 501. The forearm 517 has an underside clevis 519 with opposed apertures 521. A hydraulic cylinder 523 is pivotally linked between the lower rear portion of the frame 501 and the clevis 519 by a rod pin 525 extending through the opposed clevis apertures 521 and a barrel pin 527 extending through opposed apertures 529 in the frame 501. Instead of an elbow 509, the arm could be curved or even straight, so long as in its overall size and configuration the upper portion of the arm 507 clears the largest diameter pipe stick P to be handled, as will be hereinafter seen in relation to FIG. 32-34.

Figure 30:
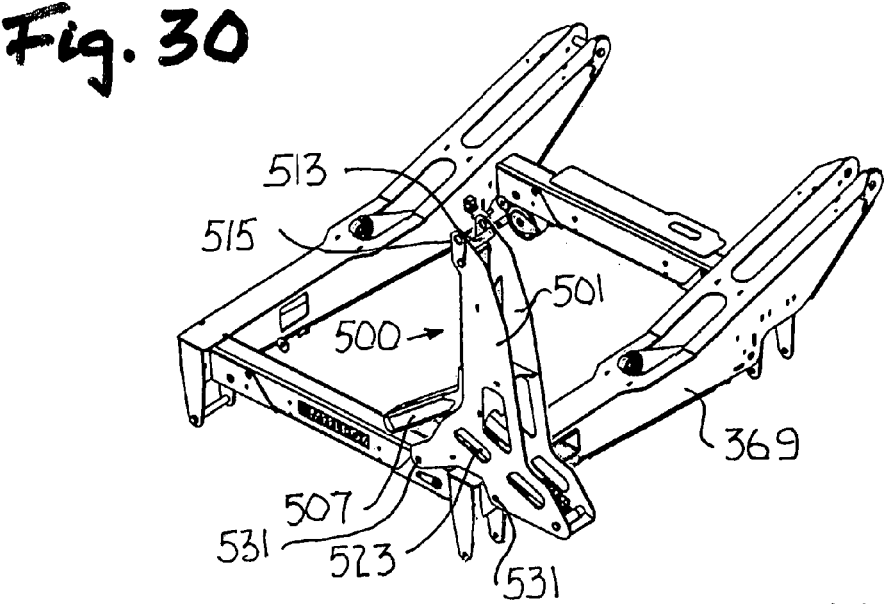
FIG. 30 is a perspective view illustrating the lowering arm assembly of FIG. 27 mounted on the trolley of a stand.

The arm assemblies 500 can be positioned anywhere along the length of the pipe stick P to be handled as long as the center of gravity of the pipe stick P falls between a pair of assemblies 500. As seen in FIG. 30, each arm assembly 500 is mounted on and travels with the trolley 369 of its associated roller and/or track stand 360 or 390 seen in FIGS. 21-24. Preferably, the assemblies 500 are secured to the trolleys 369 by removable pins 531 through apertures 533 in the plates 501. The arm 507 of each assembly 500 is configured to receive the pipe stick P at an elevation above its V-tracks 393 and/or V-rollers 363 and to allow the arm 507 to rock on its pivot pin 513 under the weight of the pipe stick P and against the force of its hydraulic cylinder 523 which slowly lowers the pipe stick P in a controlled manner and therefore dampens the impact of the pipe stick P as the pipe stick P is seated on its tracks 393 or rollers 363.

Figure 31:
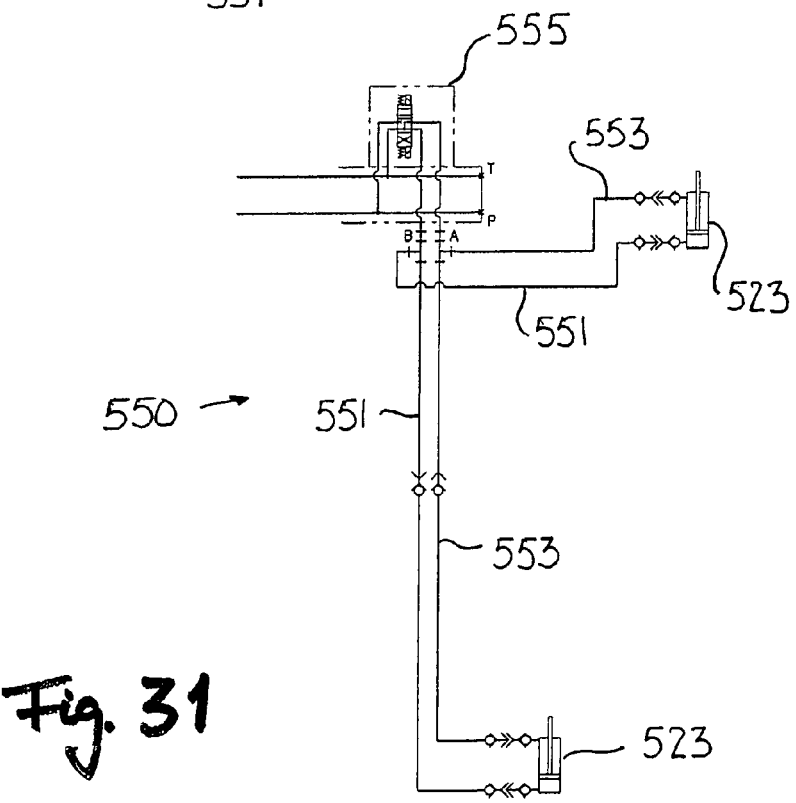
FIG. 31 is a schematic diagram of the hydraulic sub-system of the lowering arm assembly of FIG. 27.

Turning to FIG. 31, a hydraulic sub-system 550 for raising, lowering and retarding movement of the arm assemblies 500 is illustrated which can be incorporated into the hydraulic system power and control system 400 of FIG. 25 at points T and P common to both systems 400 and 550. Each lowering arm cylinder 523 is connected by two hoses 551 and 553 to a hydraulic control valve 555 with an open center spool so that, when not actuated to raise or lower the arms 507, the hydraulic fluid is free to flow between the rod and barrel ends of the cylinders 523 and the reservoir 405 of the main system 400. The valve 555 is electrically operated through solenoids that are piggy-backed to the toggle switch 443 which is located on the operator's pendant 445 seen in FIG. 26 and which operates the pipe dispenser cam cylinders 343 seen in FIG. 25. When the dispenser toggle switch 443 is set to dispense a pipe stick P, the lowering arms 507 are raised. When the dispenser toggle switch 443 is set to receive a pipe stick P, the lowering arms 507 are lowered. Preferably, the lowering arm control valve 555 is located on the V-track pipe stand 390. Since the hoses 551 and 553 of the track stand lowering arm assembly 500 are shorter than the hoses 551 and 553 of the roller stand lowering arm assembly 500, the flow resistance of the roller stand hoses 551 and 553 is greater than the flow resistance of the track stand hoses 551 and 553, which can cause the more distant arm 507 to lag during raising or lowering. Therefore, the inner diameter of the track stand hoses 551 and 553 is smaller, perhaps ¼" ID, than the inner diameter of the roller stand hoses 551 and 553, perhaps ⅜" ID, so as to coordinate the operation of the lowering arms 507.

In operation, when the pipe stick dispenser switch 443 is set to dispense a pipe stick P, the control valve 555 actuates to raise both lowering arms 507. The lowering arms 507 are fully raised before the pipe stick P is dispensed because the dispenser components of the main hydraulic system 400 slow the actuation of the pipe stick dispensers 330. After the pipe stick P is dispensed, the switch 443 is released and the valve 555 returns to open center. As seen in FIG. 32, the lowering arms 507 stay raised due to the seal friction of the lowering arm assembly cylinders 523. The dispensed pipe stick P rolls toward and contacts the lowering arms 507. As seen in FIG. 33, the arms 507 lower while exerting a retarding force against the pipe stick P because the hydraulic fluid must flow from the barrel ends of the cylinders 523 back through the hoses 551 to the control valve 555 and return to the rod ends of the cylinders 523 through the other hose 553. Excess fluid flows from the valve 555 to the reservoir 405. As seen in FIG. 34, the arms 507 maintain contact with the lowered pipe stick P when it rests on the V tracks 393 or rollers 363. If it is desired to allow the forearms 517 to rotate sufficiently to release the pipe stick P completely after it rests on the V tracks 393 or roller 363, the switch 443 can be operated to cause the dispensers 330 to reload. This will also cause further downward rotation of the arms 507 to disengage the arms 507 from the pipe stick P.

Thus, it is apparent that there has been provided, in accordance with the invention, a rack-type pipe feeder that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For transferring sticks of heavy polyolefin pipe to a fusion machine for joining the sticks to a pipeline, a process comprising the steps of:
   loading multiple sticks of pipe on a rack inclined to gravitationally cause the supported sticks of pipe to roll toward a downstream end of the rack;
   adjusting an angular relationship of downstream and upstream arms of a pair of spaced-apart V-shaped cams for compatibility with a diameter of the loaded pipe sticks;

synchronously rocking said cams to receive a stick of pipe from the rack with downstream arms of said cams preventing the stick from gravitationally rolling downstream out of the cams;

synchronously rocking said cams to discharge the received stick of pipe downstream of the cams with the upstream arms of the cams preventing another stick from gravitationally rolling downstream into the cams from the rack;

catching a discharged stick of pipe on a mechanical structure in approximately longitudinal alignment with a path to the fusion machine;

manipulating the mechanical structure by operation of the hydraulic system to align planar Cartesian coordinates of a longitudinal axis of the caught stick of pipe for insertion into the fusion machine; and driving the aligned stick of pipe along the mechanical structure toward the fusion machine by operation of the hydraulic system.

2. For transferring sticks of heavy polyolefin pipe to a fusion machine for joining the sticks to a pipeline, a process comprising the steps of:

loading multiple sticks of pipe on a rack inclined to gravitationally cause the supported sticks of pipe to roll toward a downstream end of the rack;

dispensing one stick of pipe at a time from the rack to gravity by operation of a hydraulic system;

catching a discharged stick of pipe on a boom supported by a trolley with the caught stick in approximately longitudinal alignment with a path to the fusion machine;

operating the hydraulic system to align planar Cartesian coordinates of a longitudinal axis of the caught stick of pipe for insertion into the fusion machine by vertically reciprocating the boom to position the pipe at an elevation for, and laterally reciprocating the trolley to position the pipe laterally for, insertion into the fusion machine; and driving the aligned stick of pipe along the boom toward the fusion machine by operation of the hydraulic system.

3. A pipe stick transferring process according to claim 2, said step of driving comprising propelling a pair of tracks supporting the stick of pipe on the boom.

4. A pipe stick transferring process according to claim 3 further comprising the step, prior to inserting the pipe stick into the fusion machine, of rotating the stick of pipe to match an ovality thereof with all ovality of the pipeline to which the stick of pipe will be joined.

5. A pipe stick transferring process according to claim 4, said step of rotating comprising, with the tracks supporting a downstream end of the stick of pipe, the sub-steps of:

lowering the boom to rest a downstream end of the pipe stick on a lift roller of the fusion machine;

shifting the trolley slightly laterally to displace the tracks below the stick of pipe;

raising the boom until the pipe stick is lifted by one of the tracks off the fusion machine lift roller and rolls into contact with both tracks; and repeating the steps of lowering, shifting and raising until the ovalities of the stick and the pipeline are matched.

6. A pipe stick transferring process according to claim 4, the boom having a V-shape for receiving the stick of pipe, said step of rotating comprising, with the boom raised and supporting the stick of pipe, the sub-steps of:

positioning at least one horizontal beam to be spaced below and extending laterally in relation to the pipe stick;

shifting the trolley in a direction opposite the direction the pipe stick is to be rotated to reposition the pipe stick above the horizontal beam;

lowering the boom until the pipe stick is oriented within the V-shape of the boom but rested only on the horizontal beam;

shifting the trolley in the direction the pipe stick is to be rotated to roll the pipe stick along the horizontal beam;

terminating shifting upon the first to occur of reaching the desired rotational orientation of the pipe stick and reaching the end of the horizontal beam;

raising the boom until the pipe stick is spaced above the horizontal beam; and repeating the steps of shifting, lowering, shifting, terminating and raising until the desired rotational orientation of the pipe stick is achieved.

* * * * *